United States Patent
Caamaño et al.

(10) Patent No.: US 11,146,123 B2
(45) Date of Patent: Oct. 12, 2021

(54) ELECTRIC MACHINES WITH ENERGIZABLE AND NON-ENERGIZERABLE U-SHAPED STATOR SEGMENTS

(71) Applicant: Green Ray Technologies LLC, Gilroy, CA (US)

(72) Inventors: Ramon Anthony Caamaño, Gilroy, CA (US); Hector Luis Moya, Austin, TX (US); Jeffrey Wayne Harris, Austin, TX (US); Robert R. Ferber, Woodside, CA (US)

(73) Assignee: GREEN RAY TECHNOLOGIES, LLC, Gilroy, CA (US)

( * ) Notice: Subject to any disclaimer, the term of this patent is extended or adjusted under 35 U.S.C. 154(b) by 1102 days.

(21) Appl. No.: 14/376,496

(22) PCT Filed: Jan. 31, 2013

(86) PCT No.: PCT/US2013/024126
§ 371 (c)(1),
(2) Date: Aug. 4, 2014

(87) PCT Pub. No.: WO2013/116506
PCT Pub. Date: Aug. 8, 2013

(65) Prior Publication Data
US 2015/0048713 A1 Feb. 19, 2015

Related U.S. Application Data
(60) Provisional application No. 61/594,724, filed on Feb. 3, 2012.

(51) Int. Cl.
*H02K 1/14* (2006.01)
*H02K 15/12* (2006.01)
(Continued)

(52) U.S. Cl.
CPC ............ *H02K 1/148* (2013.01); *H02K 1/185* (2013.01); *H02K 15/12* (2013.01); *H02K 21/00* (2013.01);
(Continued)

(58) Field of Classification Search
CPC .... H02K 1/146; H02K 2201/15; H02K 1/148; H02K 1/185; H02K 1/02; H02K 15/12; H02K 21/00; Y10T 29/49012
(Continued)

(56) References Cited

U.S. PATENT DOCUMENTS 4,315,171 A * 2/1982 Schaeffer ............... H02K 41/03
                                              310/216.109
6,140,726 A * 10/2000 Suzuki ................... H02K 1/145
                                              310/216.055
(Continued)

FOREIGN PATENT DOCUMENTS

WO   WO-2012059110 A2 *  5/2012  .............. H02K 3/28

OTHER PUBLICATIONS

International Search Report and Written Opinion of the International Searching Authority issued in International Application No. PCT/US2013/024126 dated Apr. 8, 2013; 15 pages.

*Primary Examiner* — Maged M Almawri
(74) *Attorney, Agent, or Firm* — Husch Blackwell LLP

(57) ABSTRACT

A method of making a stator module for use in a stator assembly of an electric machine includes temporarily supporting a plurality of stator segments in a desired orientation using a temporary support. The desired orientation of the stator segments is a relative orientation of the stator segments within the stator module. A mold is placed around the plurality of stator segments and the mold is filled with a potting material to form a stator module such that the potting (Continued)

material supports the stator segments in their desired orientation. The temporary support is removed.

9 Claims, 14 Drawing Sheets

(51) Int. Cl.
    *H02K 1/18* (2006.01)
    *H02K 21/00* (2006.01)
    *H02K 1/02* (2006.01)

(52) U.S. Cl.
    CPC ........... *H02K 1/02* (2013.01); *H02K 2201/15* (2013.01); *Y10T 29/49012* (2015.01)

(58) Field of Classification Search
    USPC .... 310/216.063, 216.059, 216.008, 216.009,
        310/216.016, 216.022, 216.023, 216.024,
        310/216.025, 216.035, 216.088, 216.099,
        310/216.106, 216.067
    See application file for complete search history.

(56) References Cited

U.S. PATENT DOCUMENTS

| | | | |
|---|---|---|---|
| 6,188,159 B1 * | 2/2001 | Fan | H02K 1/141 310/216.026 |
| 7,030,534 B2 * | 4/2006 | Caamano | H02K 1/02 310/254.1 |
| 7,358,639 B2 * | 4/2008 | Caamano | H02K 1/141 310/216.023 |
| 8,053,944 B2 * | 11/2011 | Calley | H02K 21/227 310/181 |
| 8,816,546 B2 * | 8/2014 | Bywaters | H02K 1/16 310/216.049 |
| 9,331,528 B2 * | 5/2016 | Heins | H02K 21/24 |
| 2003/0141778 A1 * | 7/2003 | Caamano | H02K 1/02 310/254.1 |
| 2005/0099082 A1 | 5/2005 | Nashiki | |
| 2007/0257566 A1 * | 11/2007 | Vollmer | H02K 3/28 310/180 |
| 2008/0246362 A1 * | 10/2008 | Hirzel | H02K 21/12 310/156.02 |
| 2009/0001843 A1 | 1/2009 | Enomoto et al. | |
| 2009/0079532 A1 * | 3/2009 | Muelleman | H01F 27/245 336/234 |
| 2009/0091210 A1 * | 4/2009 | Bade | H02K 1/148 310/216.009 |
| 2009/0102314 A1 * | 4/2009 | Miyata | H02K 1/145 310/257 |
| 2010/0277023 A1 | 11/2010 | Kamida et al. | |
| 2011/0309712 A1 * | 12/2011 | Chin | H02K 3/28 310/216.112 |
| 2012/0074797 A1 * | 3/2012 | Petter | H02K 21/16 310/51 |

* cited by examiner

ELECTRIC MACHINES WITH ENERGIZABLE AND NON-ENERGIZERABLE U-SHAPED STATOR SEGMENTS This application is a U.S. National Stage of PCT/US2013/024126 filed on Jan. 31, 2013, which claims priority to U.S. Provisional Application No. 61/594,724 filed on Feb. 3, 2012, the entire contents of which are hereby incorporated by reference.

This application is a continuation of application Ser. No. 14/376,496, filed on Aug. 4, 2014, whose disclosures are incorporated herein by reference.

BACKGROUND

The electric motor and/or generator industry is continuously searching for cost effective electric motors and/or generators with increased efficiency and power density. For some time now, it has been believed that motors and generators constructed using permanent super magnet rotors (for example cobalt rare earth magnets and Neodymium-Iron-Boron magnets) and stators including electromagnets with magnetic cores formed from thin film soft magnetic material have the potential to provide substantially higher efficiencies and power densities compared to conventional motors and generators. However, to date it has proved very difficult to provide a cost effective and easily manufacturable motor or generator that includes magnetic cores formed from thin film soft magnetic materials.

Thin film soft magnetic low loss materials such as amorphous metal or nano-crystalline material are normally supplied in a thin continuous tape having a uniform tape width. Many other magnetic materials may also be provided in the form of a long continuous tape. For purposes of this description, the term tape wound magnetic cores is meant to include any magnetic core formed by winding a thin tape magnetic material into a coil to form a magnetic core.

SUMMARY

In general, aspects of the present disclosure are directed to methods of making an electric motor and/or generator including a stator assembly having a plurality of independently energizable stator segments with each stator segment including an associated tape wound magnetic core. Aspects of the present disclosure also relate to methods of making an electric motor and/or generator including a cast rotor. Aspects of the present disclosure further provide methods and arrangements for increasing the efficiency and cost effectiveness of electric motors and/or generators that use tape wound magnetic cores, as well as methods for manufacturing components for these electric motors and/or generators.

In some aspects, the present disclosure provides a rotating electric machine including a rotor assembly supported for rotation about a rotational axis and a stator assembly. The rotor assembly may include a plurality of rotor poles with the rotor poles supported for rotation along a rotor pole circular path about the rotational axis with a desired rotor pole spacing between adjacent rotor poles. The stator assembly may include a plurality of independently energizable stator segments with each stator segment including a magnetic core that defines a plurality of stator poles for magnetically interacting with the rotor poles. The stator segments may be positioned adjacent to the rotor pole circular path such that the stator poles face the rotor pole circular path with a desired stator pole spacing between adjacent stator poles. The stator segments may also be positioned adjacent to only a portion of the rotor pole circular path such that there is at least one stator pole gap between at least two stator poles that is greater than the desired stator pole spacing. The stator assembly may further include at least one non-energizable termination magnetic core positioned within the stator pole gap and adjacent to one of the stator segments such that the termination core provides an additional magnetic flux return path for magnetic flux associated with the energizing of the adjacent stator segment.

In some aspects, the stator assembly may include a plurality of independent stator modules with each stator module including a plurality of the stator segments and at least one of the independent stator modules including at least one termination magnetic core.

In some aspects, there may be a stator pole gap between each stator module and each stator module may include at least one termination core.

In some aspects, the magnetic cores of the stator segments may be U-shaped magnetic tape wound cores formed from multiple layers of thin film soft magnetic tape material having a desired tape width and tape thickness. The two legs of each U-shaped magnetic tape wound core may define two stator poles of the associated stator segment.

In some aspects, the termination magnetic cores may be U-shaped magnetic tape wound cores formed from multiple layers of thin film soft magnetic tape material having a desired tape width and tape thickness.

In some aspects, the rotating electric machine may be a radial gap electric machine and each stator segment may be positioned such that the two stator poles of each stator segment are located adjacent to one another and in line with one another along a line that is parallel with the rotational axis of the electric machine. The rotor poles may be pairs of rotor poles formed from adjacent pairs of permanent magnet segments configured to form rotor poles of opposite magnetic polarity. Each pair of permanent magnet segments may be positioned with the two permanent magnet segments located adjacent to one another and in line with one another along a line that is parallel with the rotational axis of the electric machine. The two permanent magnet segments may define two adjacent circular paths around the rotational axis of the electric machine when the rotor is rotated about the rotational axis of the electric machine. Each of the two adjacent circular paths may face an associated one of the stator poles of each independently energizable stator segment.

In some aspects, the present disclosure provides a method of making a rotating electric machine. The method may include providing a rotor assembly supported for rotation about a rotational axis. The rotor assembly may include a plurality of rotor poles with the rotor poles being supported for rotation along a rotor pole circular path about the rotational axis with a desired rotor pole spacing between adjacent rotor poles. The method may further include placing a stator assembly having multiple independently energizable stator segments adjacent to the rotor assembly. Each stator segment may include a magnetic core that defines a plurality of stator poles for magnetically interacting with the rotor poles. The stator segments may be positioned adjacent to the rotor pole circular path such that the stator poles face the rotor pole circular path with a desired stator pole spacing between adjacent stator poles. The stator segments may also be positioned adjacent to only a portion of the rotor pole circular path such that there is at least one stator pole gap between at least two stator poles that is greater than the desired stator pole spacing. At least one termination magnetic core may be placed within the stator pole gap and adjacent to one of the stator segments such that the termination core provides an additional magnetic flux return path for magnetic flux associated with the energizing of the adjacent stator segment.

In some aspects, the stator assembly may include a plurality of independent stator modules with each stator module including a plurality of the stator segments and the step of placing at least one termination magnetic core within the stator pole gap may include the step of placing at least one termination magnetic core in at least one of the independent stator modules.

In some aspects, there may be a stator pole gap between each stator module and each stator module may include at least one termination core.

In some aspects, the magnetic cores of the stator segments may be U-shaped magnetic tape wound cores formed by winding multiple layers of thin film soft magnetic tape material having a desired tape width and tape thickness into an oval shape and cutting the winding into two U-shaped pieces. The two legs of each U-shaped magnetic tape wound core may define two stator poles of the associated stator segment.

In some aspects, the termination magnetic cores may be U-shaped magnetic tape wound cores formed by winding multiple layers of thin film soft magnetic tape material having a desired tape width and tape thickness into an oval shape and cutting the winding into two U-shaped pieces.

In some aspects, the rotating electric machine may be a radial gap electric machine and each stator segment may be positioned such that the two stator poles of each stator segment are located adjacent to one another and in line with one another along a line that is parallel with the rotational axis of the electric machine. The rotor poles may be pairs of rotor poles formed from adjacent pairs of permanent magnet segments configured to form rotor poles of opposite magnetic polarity. Each pair of permanent magnet segments may be positioned with the two permanent magnet segments located adjacent to one another and in line with one another along a line that is parallel with the rotational axis of the electric machine. The two permanent magnet segments may define two adjacent circular paths around the rotational axis of the electric machine when the rotor is rotated about the rotational axis of the electric machine. Each of the two adjacent circular paths may face an associated one of the stator poles of each independently energizable stator segment.

In some aspects, the present disclosure provides a magnetic core for use in a stator assembly of an electric machine having a rotor with a plurality of rotor poles. The magnetic core may include a tape wound magnetic core piece formed from multiple layers of thin film soft magnetic tape material of a desired tape width and tape thickness. The tape wound magnetic core may define at least portions of a plurality of stator poles adapted to magnetically interacting with the rotor poles of the electric machine. Each stator pole may have a pole face adapted to face the rotor of the electric machine and each stator pole face may include at least portions of the ends of at least some of the multiple layers of thin film soft magnetic tape material. The magnetic core may also include a stator pole face enlarging piece attached to the stator pole portions of the tape wound magnetic core piece to enlarge the surface area of the stator pole face and allow at least portions of the ends of at least some of the multiple layers of thin film soft magnetic tape material to form portions of the stator pole face.

In some aspects, the tape wound magnetic core piece may be a U-shaped magnetic core piece formed by winding multiple layers of the thin film soft magnetic tape material into an oval shape and cutting the winding to form two U-shaped magnetic core pieces. Each U-shaped magnetic core piece may define at least portions of two stator poles.

In some aspects, the stator pole face may include the cut ends of each layer of the thin film soft magnetic tape material.

In some aspects, the stator pole face enlarging piece may fully surround the stator pole portions of the tape wound magnetic core piece.

In some aspects, the stator pole face enlarging piece may be made from a pressed powder magnetic material.

In some aspects, the stator pole face enlarging piece may have a uniform thickness perpendicular to the stator pole face.

In some aspects, the present disclosure provides a method of making a magnetic core for use in a stator assembly of an electric machine having a rotor with a plurality of rotor poles. The method may include winding multiple layers of a thin film soft magnetic tape material of a desired tape width and tape thickness into a desired shape. The winding may be cut to form a tape wound magnetic core piece that defines at least portions of a plurality of stator poles adapted to magnetically interacting with the rotor poles of the electric machine. Each stator pole may have a pole face adapted to face the rotor of the electric machine and each pole face may include at least portions of the cut ends of at least some of the multiple layers of thin film soft magnetic tape material. A stator pole face enlarging piece may be attached to the stator pole portions of the tape wound magnetic core piece to enlarge the surface area of the stator pole face and allow at least portions of the ends of at least some of the multiple layers of thin film soft magnetic tape material to form portions of the stator pole face.

In some aspects, the tape wound magnetic core piece may be a U-shaped magnetic core piece formed by winding multiple layers of the thin film soft magnetic tape material into an oval shape and cutting the winding to form two U-shaped magnetic core pieces. Each U-shaped magnetic core piece may define at least portions of two stator poles.

In some aspects, the stator pole face may include the cut ends of each layer of the thin film soft magnetic tape material.

In some aspects, the stator pole face enlarging piece may fully surround the stator pole portions of the tape wound magnetic core piece.

In some aspects, the stator pole face enlarging piece may be pressed from pressed powder magnetic material.

In some aspects, the stator pole face enlarging piece may have a uniform thickness perpendicular to the stator pole face.

In some aspects, the magnetic core may include electrically conductive windings that are placed around the stator poles of the tape wound magnetic core piece. The stator pole face enlarging piece may be adhered to the sides of the stator pole and adhered to at least portions of the electrically conductive windings. This may assist in the structural support of the stator pole face enlarging piece.

In some aspects, the present disclosure provides a method of making a rotating electric machine having a rotational axis. The method may include providing a stator assembly that defines a plurality of stator poles positioned adjacent to at least portions of a rotor pole circular path about the rotational axis of the electric machine. A rotor housing may be cast from a desired casting material and a plurality of rotor poles may be formed in the rotor housing to create a rotor assembly with the rotor housing providing a magnetic flux return path for the rotor poles. The rotor assembly may be supported for rotation about the rotational axis of the electric machine such that the plurality of rotor poles are supported for rotation along the rotor pole circular path.

In some aspects, the casting material may be a cast iron.

In some aspects, the cast iron may be grey iron.

In some aspects, the step of casting a rotor housing may include the step of providing a magnetic back iron and casting a rotor housing from a desired casting material around the back iron.

In some aspects, the magnetic back iron may be an iron alloy band.

In some aspects, the desired casting material may be an aluminum alloy casting material.

In some aspects, the step of forming a plurality of rotor poles in the rotor housing may include the step of supporting a plurality of permanent magnets in the rotor housing to form the rotor poles.

In some aspects, the step of supporting a plurality of permanent magnets in the rotor housing may include the step of using a magnet spacing track to place the permanent magnets in desired locations in the rotor housing and the step of adhering the permanent magnets and magnet spacing track to the rotor housing to form the rotor assembly.

In some aspects, the electric machine may be a radial gap machine.

In some aspects, the rotor poles may be pairs of rotor poles formed from adjacent pairs of permanent magnet segments configured to form rotor poles of opposite magnetic polarity. Each pair of permanent magnet segments may be positioned such that the two permanent magnet segments are located adjacent to one another and in line with one another along a line that is parallel with the rotational axis of the electric machine such that the two permanent magnet segments define two adjacent circular paths around the rotational axis of the electric machine when the rotor is rotated about the rotational axis of the electric machine.

In some aspects, the stator poles may face outward away from the rotational axis and the rotor assembly may surround the stator assembly with the rotor poles facing inward toward the rotational axis.

In some aspects, the electric machine may be a wheel hub motor.

In some aspects, the present disclosure provides a method of making a rotor assembly for use in a rotating electric machine having a rotational axis. The method may include casting a rotor housing from a desired casting material. A plurality of rotor poles may be formed in the rotor housing to create a rotor assembly with the rotor housing providing a magnetic flux return path for the rotor poles. The rotor assembly may be supported for rotation about the rotational axis of the electric machine such that the plurality of rotor poles are supported for rotation along the rotor pole circular path.

In some aspects, the casting material may be a cast iron.

In some aspects, the cast iron may be grey iron.

In some aspects, the step of casting a rotor housing may include the step of providing a magnetic back iron and casting a rotor housing from a desired casting material around the back iron.

In some aspects, the magnetic back iron may be an iron alloy band.

In some aspects, the desired casting material may be an aluminum alloy casting material.

In some aspects, the step of forming a plurality of rotor poles in the rotor housing may include the step of supporting a plurality of permanent magnets in the rotor housing to form the rotor poles.

In some aspects, the step of supporting a plurality of permanent magnets in the rotor housing may include the step of using a magnet spacing track to place the permanent magnets in desired locations in the rotor housing and the step of adhering the permanent magnets and magnet spacing track to the rotor housing to form the rotor assembly.

In some aspects, the electric machine may be a radial gap machine.

In some aspects, the rotor poles may be pairs of rotor poles formed from adjacent pairs of permanent magnet segments configured to form rotor poles of opposite magnetic polarity. Each pair of permanent magnet segments may be positioned such that the two permanent magnet segments are located adjacent to one another and in line with one another along a line that is parallel with the rotational axis of the electric machine such that the two permanent magnet segments define two adjacent circular paths around the rotational axis of the electric machine when the rotor is rotated about the rotational axis of the electric machine.

In some aspects, the rotor poles may face inward toward the rotational axis.

In some aspects, the electric machine may be a wheel hub motor.

In some aspects, the present disclosure provides a rotating electric machine having a rotational axis. The electric machine may include a stator assembly that defines a plurality of stator poles positioned around at least portions of a circular path about the rotational axis of the electric machine. A rotor assembly may be supported for rotation about the rotational axis of the electric machine. The rotor assembly may include a plurality of rotor poles that are supported for rotation along a rotor pole circular path about the rotational axis of the electric machine. The rotor assembly may also include a cast rotor housing for supporting the plurality of rotor poles for rotation about the rotational axis of the electric machine.

In some aspects, the present disclosure provides a rotor for use in a rotating electric machine having a rotational axis. The rotor may include a plurality of rotor poles that are supported for rotation along a rotor pole circular path about the rotational axis of the electric machine. The rotor may also include a cast rotor housing for supporting the plurality of rotor poles for rotation about the rotational axis of the electric machine.

In some aspects, the present disclosure provides a method of making a stator module for use in a stator assembly of an electric machine. The method may include temporarily supporting a plurality of stator segments in a desired orientation using a temporary support with the desired orientation of the stator segments being a relative orientation of the stator segments within the stator module. A mold may be placed around the plurality of stator segments and the mold may be filled with a potting material to form a stator module such that the potting material supports the stator segments in their desired orientation. The temporary support may be removed.

In some aspects, the temporary support may be a magnetic jig that uses magnetic force to support the plurality of stator segments in the desired orientation.

In some aspects, the magnetic jig may include a permanent magnet associated with each stator segment with each permanent magnet providing a magnetic force that holds its associated stator segment against a stator segment orienting surface.

In some aspects, the mold may be a stator module housing that remains part of the stator module.

In some aspects, the potting material may be the only material structurally supporting the stator segments in their desired orientation within the stator module after the temporary support is removed.

In some aspects, the potting material may be a thermally conductive epoxy and filler mixture.

In some aspects, the potting material may be a pourable powder mixture including a heat activated powered adhesive and a filler.

In some aspects, the filler may be an alumina coated aluminum powder.

In some aspects, each stator segment may include at least one electrically conductive winding for independently energizing the stator segment and each winding may include electrically conductive leads for electrically connecting the electrically conductive windings to other electrical components. The method may further include the step of electrically interconnecting the electrically conductive leads of the electrically conductive windings using an electrical connection arrangement. The step of placing a mold around the plurality of stator segments may include the step of placing the mold around the electrical connection arrangement. The step of filling the mold with a potting material to form a stator module may include the step of filling the mold with a potting material to form a stator module with the potting material supporting the stator segments and electrical connection arrangement within the stator module.

In some aspects, the electrical connection arrangement may be a printed circuit board.

In some aspects, the printed circuit board may include a controller for controlling the operation of the individually energizable stator segments.

In some aspects, the method may include using a plurality of different electrical connection arrangements to provide a plurality of different stator module electrical configurations without varying other components making up the stator module.

In some aspects, the plurality of stator module electrical configurations may include different electric machine operating voltages.

In some aspects, the present disclosure provides a method of making a rotating electric machine having a rotational axis. The method may include providing a plurality of stator modules with each stator module defining a plurality of stator poles. A stator module support arrangement may be provided for supporting the stator modules. A stator module positioning jig may be used to position the stator modules in a desired location on the stator module support arrangement such that the stator poles of the stator modules are positioned adjacent to at least portions of a rotor pole circular path about the rotational axis of the electric machine. The stator modules may be attached to the stator module support arrangement such that the stator modules are fixed in the desired location on the stator module support arrangement. A rotor assembly having a plurality of rotor poles may be provided and the rotor assembly may be attached to the stator module support arrangement for rotation about the rotational axis of the electric machine such that the plurality of rotor poles are supported for rotation along the rotor pole circular path.

In some aspects, the stator module support arrangement may include indexing features for holding the stator modules in the desired location once the stator modules have been attached to the stator module support arrangement.

In some aspects, the indexing features may include a position locking surface finish on the contact surfaces between the stator modules and the stator module support arrangement.

In some aspects, the position locking surface finish may be a knurled surface finish.

DESCRIPTION OF DRAWINGS

Like reference numerals in the various drawings indicate like elements.

DETAILED DESCRIPTION

Aspects of the present disclosure are directed to methods of making an electric motor and/or generator including a stator assembly having a plurality of independently energizable stator segments with each stator segment including an associated tape wound magnetic core. Aspects of the present disclosure also relate to methods of making an electric motor and/or generator including a cast rotor. Aspects of the present disclosure further provide methods and arrangements for increasing the efficiency and cost effectiveness of electric motors and/or generators that use tape wound magnetic cores, as well as methods for manufacturing components for these electric motors and/or generators. U.S. Pat. Nos. 6,603,237, 6,879,080, 7,030,534, and 7,358,639 and PCT patent applications PCT/US2010/048019, PCT/US2010/048027, and PCT/US2010/048028, all of which are incorporated herein by reference in their entireties for all purposes, are directed to certain electric motors and/or generators that may include tape wound magnetic cores.

Figure 1:
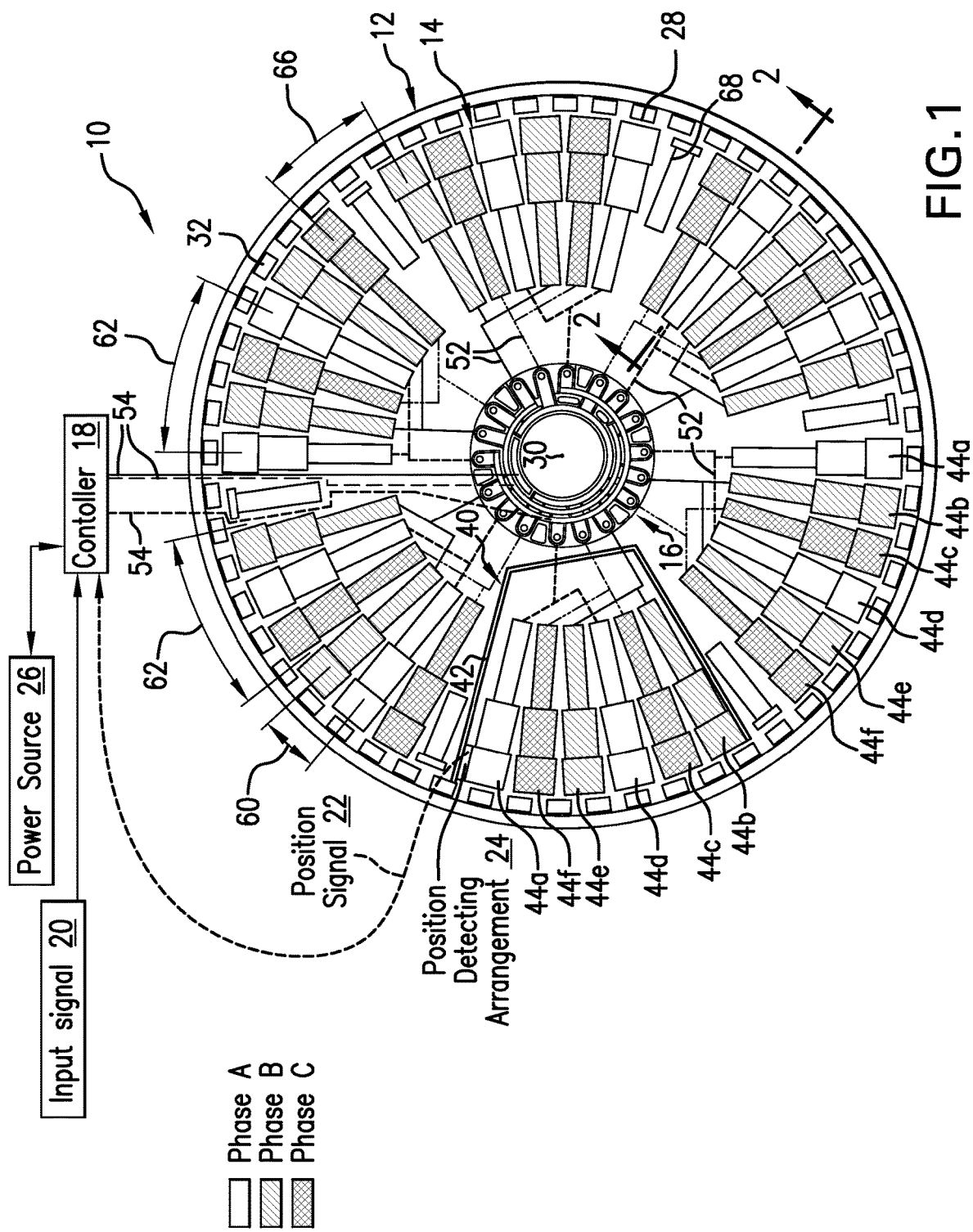
FIG. 1 is a schematic illustration of an electric machine including stator modules and stator segments in accordance with aspects of the present disclosure.

Referring now to FIG. 1, an electric machine 10 in accordance with aspects of the present disclosure is illustrated. Electric machine 10 may include, but is not limited to, an electric motor and/or an electric generator. Electric machine 10 includes a rotor assembly 12, a stator assembly 14, a bus bar module 16, and a controller 18. Controller 18 regulates operation of electric machine 10 based on an input signal 20 and a position signal 22. Input signal 20 may include a throttle signal, for example, in the case where electric machine 10 is implemented in a vehicle, motorcycle, scooter, or the like. The electric machine may include a Hall Effect sensor or other position detecting arrangement 24 for detecting the position of rotor assembly 12 relative to stator assembly 14. The Hall Effect sensor or other position detecting arrangement 24 may generate position signal 22 used by the controller. Controller 18 may regulate power provided to electric machine 10 from a power source 26, when electric machine 10 is operating in a motor mode. Electric machine 10 may generate power that can be provided to, and stored in power source 26, when electric machine 10 is operating in as a generator.

Although electric machine 10 may be provided as a DC brushless motor, it is contemplated that electric machine 10 may be provided as one of a variety of other types of electric machines within the scope of the present disclosure. Such electric machines include, but are not limited to, DC synchronous electric machines, variable reluctance or switched reluctance electric machines, and induction type electric machines. For example, permanent magnets may be implemented as the rotor poles of electric machine 10, in the case where electric machine 10 is provided as a DC brushless electric machine, as discussed in further detail below. In the case of a switched reluctance electric machine, or an induction electric machine, the rotor poles may be provided as protrusions of other magnetic materials formed from laminations of materials such as iron or preferably thin film soft magnetic materials, for example. In other arrangements, the rotor poles can be provided as electromagnets.

In the arrangement of FIG. 1, electric machine 10 may be provided as a hub-type electric machine with rotor assembly 12 located around the outer perimeter of electric machine 10. That is, stator assembly 14 may be surrounded by rotor assembly 12. Although not illustrated in FIG. 1, rotor assembly 12 may be supported by bearings to rotate relative to stator assembly 14. A radial gap 28 separates rotor assembly 12 from stator assembly 14. In alternative arrangements, rotor assembly 12 may be supported for rotation relative to stator assembly 14 about a rotational axis 30 using other suitable means. Although electric machine 10 is described as a radial gap machine with the stator assembly being surrounded by the rotor assembly, this is not a requirement. Instead, the machine may be a radial gap machine with the stator assembly surrounding the rotor assembly. Alternatively, the rotor assembly and the stator assembly may be axially adjacent to one another forming an axial gap machine.

Figure 2:
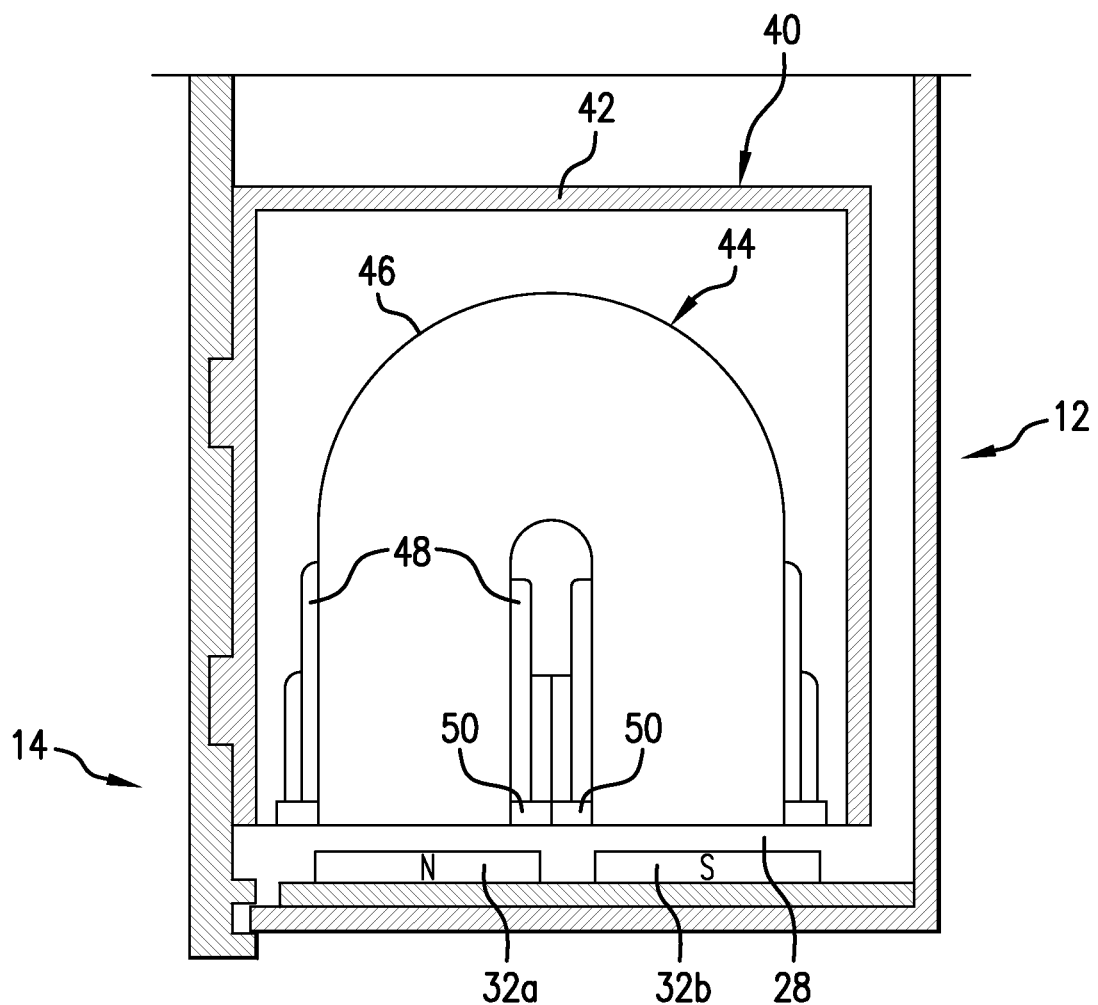
FIG. 2 is a cross sectional view of the electric machine of FIG. 1 illustrating a stator segment and a stator module housing in accordance with aspects of the present disclosure.

In the example of FIG. 1, rotor assembly 12 includes fifty-six pairs of radially adjacent permanent magnets 32 that form the rotor poles of rotor assembly 12. In some implementations, the pairs of permanent magnets 32 may be provided as super magnets such as cobalt rare earth magnets, or any other suitable or readily providable magnet material. As illustrated best in the cross sectional view of FIG. 2, each of the pairs of permanent magnets 32 includes a first magnet oriented to form a north rotor pole 32a, and a second magnet oriented to form a south rotor pole 32b. The first magnet is located adjacent to the second magnet such that the two permanent magnets are in line with one another along a line that is generally parallel with the rotational axis 30 of electric machine 10. Accordingly, the two permanent magnets define adjacent circular paths about the rotational axis 30 of electric machine 10 when rotor assembly 12 rotates. As shown in FIG. 2, the permanent magnet pairs are positioned around the inside periphery of rotor assembly 12 facing radial gap 28. Each consecutive pair of permanent magnets 32 is reversed such that all of the adjacent magnet segments alternate from north to south around the entire rotor assembly 12.

Although permanent magnet pairs 32 may be provided as permanent super magnets, other magnetic materials can be implemented. In some examples, electromagnets may be implemented with rotor assembly 12 in place of permanent magnets. In addition, although rotor assembly 12 of FIG. 1 is illustrated as including fifty-six magnet pairs, it is contemplated that rotor assembly 12 may include any number of magnet pairs.

Stator assembly 14 includes a plurality of stator modules 40. In the arrangement of FIG. 1, stator assembly 14 includes six stator modules 40, which are designated by reference numerals 40a, 40b, 40c, 40d, 40e and 40f in FIG. 1 for descriptive purpose. Although stator assembly 14 is described as including six stator modules 40, other arrangements are contemplated. For example, stator assemblies including more than six stator modules 40, or less than six stator modules 40 are within the scope of the present disclosure, as discussed in further detail below.

Each stator module 40 of electric machine 10 is independent from the other stator modules 40 in stator assembly 14. More specifically, each stator module 40 is independently removable and replaceable. In some implementations, a stator module 40 may be removed, and electric machine 10 can operate with less than a full complement of stator modules 40. Considering the specific arrangement of FIG. 1, for example, electric machine 10 may operate with more or less than six stator modules 40. That is, electric machine 10 of FIG. 1 may operate with one, two, three, four, five, six, or seven stator modules 40. In addition, the stator modules used may be arranged symmetrically or asymmetrically. For example, if two stator modules are used, stator modules 40a and 40b may be used to form an asymmetrical version of electric machine 10. Alternatively, modules 40a and 40d may be used to form a symmetrical version of electric machine 10.

In electric machine 10, each stator module 40 includes a stator module housing 42 and at least one stator segment 44 housed within stator module housing 42. Preferably, each stator segment 44 is identical to all of the other stator segments of electric machine 10. In the arrangement of FIG.

1, electric machine 10 is provided as a three-phase electric machine, and each stator module 40 includes six stator segments 44 that are designated by reference numerals 44*a*, 44*b*, 44*c*, 44*d*, 44*e* and 44*f* respectively in FIG. 1 for descriptive purpose. As will be described in more detail below, the positioning of the six stator segments 44*a*-*f* within stator module housing 42 in combination with the positioning of each stator module within stator assembly 14 determines with which phase of the electric machine the stator segment is associated.

Figure 3:
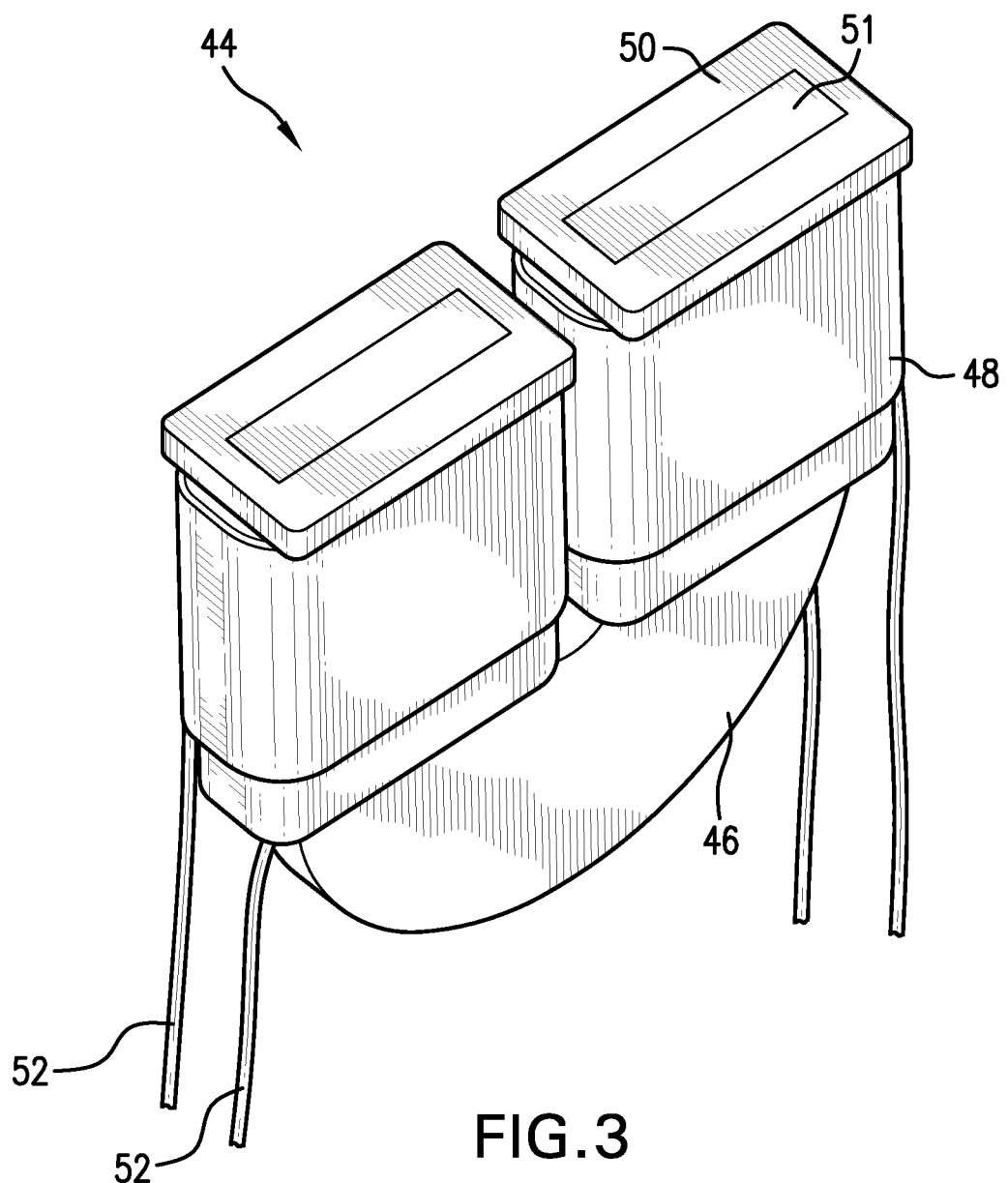
FIG. 3 is a perspective view of a stator segment of FIG. 1 in accordance with aspects of the present disclosure.

As best illustrated in FIG. 3, each stator segment includes a core 46 and coils 48 with core 46 being a U-shaped magnetic core having coils 48 around each leg of core 46. In this example, each stator segment 44 may also include a core bracelet 50 attached to the sides of the U-shaped core at the ends of the legs of the U-shaped core. Core bracelets 50 may be configured to fully surround the ends of U-shaped core 46 to provide an enlarged stator pole face 51 at each end of core 46. The use of core bracelet 50 also allows the ends of core 46 to extent through core bracelets 50 so that the ends of core 46 make up at least portions of stator pole face 51.

Core bracelets 50 may be formed from thin film soft magnetic material, powdered metal, or any other desired magnetic material. In some examples, core bracelets are formed from magnetically permeable metal powder that is pressed into the desired shape. As illustrated best in FIG. 3, core bracelets 50 may have a uniform thickness perpendicular to stator pole face 51. This use of a uniform thickness allows core bracelet 50 to be easily and economically pressed from a powdered metal material.

When electric machine 10 is operating in a motor mode, stator segments 44 of each stator module 40 may be selectively energizable by the controller 18 through bus bar module 16. When electric machine 10 is operating in a generator mode, energy may be generated by the electromagnetic interaction between rotor assembly 12 and stator modules 40, and transferred to power source 26 through bus bar module 16. To this end, bus bar module 16 may be in electrical communication with coils 48 of each of stator segments 44*a*-*f* through associated electrical leads 52. Electrical leads 52 may be integrated within stator modules 40, as discussed in further detail below. Bus bar module 16 may also be in electrical communication with controller 18 through electrical conductors 54, each of which corresponds to a phase of electric machine 10. Bus bar 16 may also be used to connect each electrical conductor 54, which is associated with a phase of electric machine 10, to each of the appropriate electrical leads 52 in stator modules 40 as described in detail in the referenced PCT patent applications PCT/US2010/048027, and PCT/US2010/048028.

Figure 4:
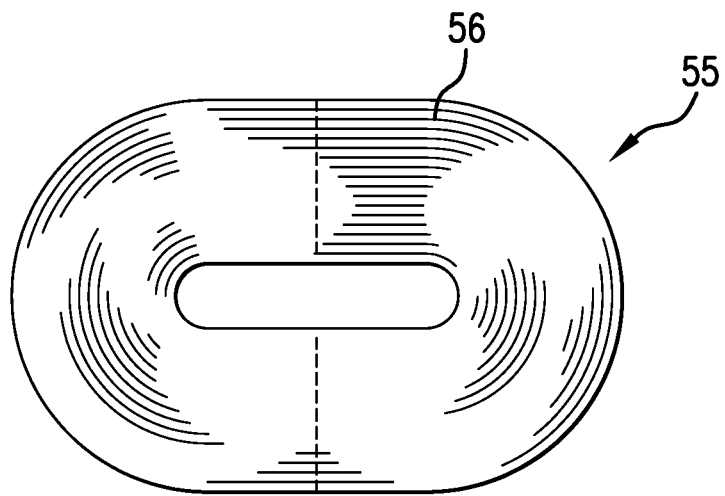
FIG. 4 is a plan view of a winding used to provide a stator core in accordance with aspects of the present disclosure.
Figure 5:
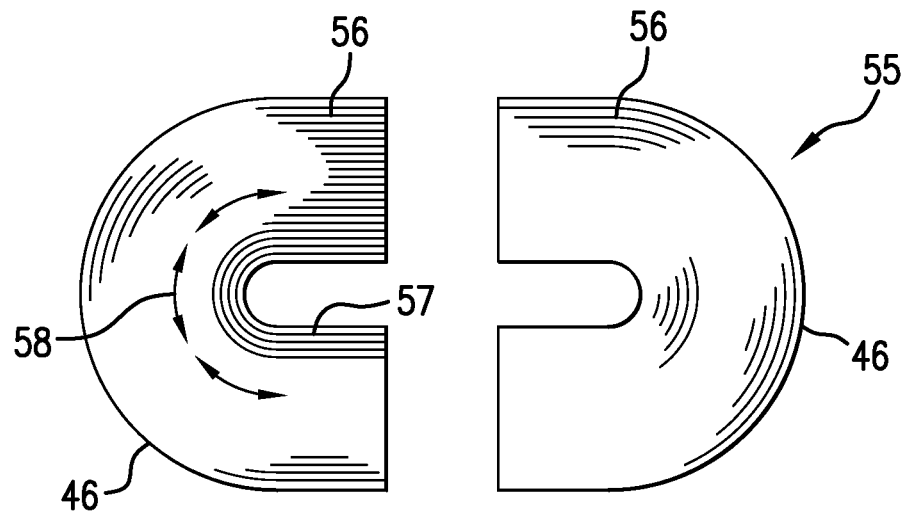
FIG. 5 is a plan view of a stator core in accordance with aspects of the present disclosure.

Referring now to FIGS. 4 and 5, the specific configuration of an exemplar magnetic core 46 for the particular examples shown in FIGS. 1-3 will be described in more detail. In these examples, each individual one-piece magnetic core 46 is formed by winding a continuous ribbon of thin film soft magnetic material into a desired shape. In this example, the shape is a generally oval shape as indicated by winding 55 in FIG. 4. Magnetic cores that are formed using this process of forming a magnetic core by winding many layers of thin film soft magnetic material to form a bulk core is generally referred to as tape wound magnetic cores.

Since thin film soft magnetic materials such as amorphous metal or nano-crystalline materials are typically provided in very thin tape or ribbon form (for example, a few thousandths of an inch or mil thick or even less than 1 mil thick), winding 55 may be made up of hundreds of winds or layers of material as illustrated by lines 56 in FIGS. 4 and 5. Once wound into the desired shape, winding 55 may be annealed to remove any stresses that may have been caused by the winding process. Then winding 55 may be saturated with an adhesive material such as a very thin wicking epoxy that may be heat cured to bind winding 55 into a rigid piece.

Once annealed, thin film soft magnetic materials may be very hard and very brittle making them somewhat difficult to machine. In the example shown in FIGS. 4 and 5, winding 55 requires only one cut in order to cut winding 55 into two U-shaped pieces. Each U-shaped piece may provide one of magnetic cores 46. As illustrated in FIG. 5, each of the two U-shaped pieces that result from cutting winding 55 are made up of a plurality of concentric U-shaped layers 57 of thin film soft magnetic material.

In some implementations, core 46 may be made from a nano-crystalline, thin film soft magnetic material. In other implementations, any thin film soft magnetic material may be used, and can include, but are not limited to, materials generally referred to as silicon iron, amorphous metals, materials similar in elemental alloy composition to amorphous metal materials that have been processed in some manner to further reduce the size of the crystalline structure of the material, and any other thin film materials.

Although the thin film soft magnetic material making up cores 46 has been primarily described as amorphous metal or nano-crystalline material, the present disclosure is not limited to these specific materials. Instead, any magnetic material that can be provided as a thin continuous tape or ribbon may be used to provide a tape wound magnetic core as described herein.

One advantage to this configuration is that when assembled into an electromagnetic assembly as described above, each one-piece magnetic core provides the entire return path for the two stator poles formed by the legs of the U-shaped magnetic core. This eliminates the need for a back iron to magnetically interconnect all of the stator poles.

Another advantage of the above described configuration is that there are no parasitic gaps within the magnetic cores. That is, each layer of thin film soft magnetic material extends continuously from one end or pole of the U-shaped magnetic core all the way around to the opposite end or pole of the U-shaped magnetic core. Therefore, this configuration orients each of the layers of thin film soft magnetic material in the proper orientation for directing magnetic flux through the magnetic core along the length of each layer of thin film soft magnetic material as illustrated by arrow 58 in FIG. 5.

As described above, each stator segment 44 within each stator module is preferably identical to all of the other stator segments in all of the other stator modules of the electric machine. This modular configuration provides several advantages over conventional electric machines.

First, by using a certain stator segment design for all of the stator segments of a particular electric machine, the magnet core and the windings that are used for the stator segment may be economically produced in mass quantities. In the case of a magnetic core that is formed from thin film soft magnetic material, this can be advantageous, because of the difficulties associated with manufacturing magnetic cores using these types of materials. Electric motors that use magnetic cores formed from thin film soft magnetic material may provide significant advantages over conventional iron core electric motors because thin film soft magnetic material can operate at very high frequencies without incurring high core losses. However, the difficulties associated with manufacturing magnetic cores for electric motors using these low loss materials have previously prevented these materials from becoming commercially successful in electric motors.

In addition to using the same magnetic core design for all of the stator segments of a particular electric machine, the same magnetic core design may be used for an entire family of electric machines. This may be accomplished by providing a variety of configurations of windings and a variety of stator module housings and other components that are associated with the same magnetic core design. Each electric machine associated with the family of machines would then use the one magnetic core design along with a particular winding configuration and a particular stator module housing. This may further increase the economies of scale associated with producing the particular magnetic core and associated family of electric machines.

In another advantage of the modular design described above, the same electric machine design may be used to provide a variety of electric machines with different power outputs. For example, in the case in which the electric machine is used as a hub motor for an electric scooter application, the same basic motor design may be used to provide an entry-level scooter with modest power output, a mid-level scooter with moderate power output, and a high-end scooter with high power output. In a specific example of this approach, an electric hub motor for a scooter may be designed to include space for up to six stator modules. An entry-level scooter may be provided with two stator modules included in the motor, a mid-level scooter may be provided with four stator modules included in the motor, and a high-end scooter may be provided with six stator modules included in the motor. This approach enables the same basic motor design to be used for all three power levels of scooter, which significantly reduces the costs associated with both developing the scooter design and manufacturing the scooter. This approach also provides the unique ability to upgrade the motor to a higher performance motor later, by adding one or more stator modules.

Most conventional electric motors are designed to operate at 50 to 60 Hz because these are the frequencies available on conventional AC electrical power grids. One of the reasons AC power is typically provided at these frequencies is that these frequencies are well within the frequency capabilities of a conventional iron core motor. Even in the case of specialty iron core motors, the frequencies typically remain below 400 Hz. This is because conventional iron core materials cannot respond to the changing magnetic fields any more quickly than this without causing very large losses that show up in the form of heat.

As described above, the electric machine designed in accordance with the disclosure may use low loss thin film soft magnetic material to form the magnetic cores of the stator segments. Low loss magnetic materials such as amorphous metal and nano-crystalline magnetic materials are typically provided as a thin continuous ribbon or tape. The methods and arrangements disclosed herein provide cost effective methods of producing electric motors and/or generators using these low loss materials. The use of low loss thin film soft magnetic material for the core material of an electric machine allows for operation at very high frequencies while maintaining high efficiency. These frequencies may be substantially greater than 400 Hz while still providing extremely high efficiencies and may be operated at frequencies as high as or greater than 2500 Hz.

As described above, exemplar electric machine 10 includes fifty-six pairs of permanent magnets evenly spaced around rotor assembly 12 and each stator module 40 includes six stator segments 44. In the example shown in FIG. 1, the stator segments 44 within a given stator module 40 are arranged with a particular stator segment spacing 60 between adjacent stator segments 44. In this example, electric machine 10 is configured to have a rotor pole to stator pole ratio of four to three. That is, four pairs of permanent magnets fit within a given arc 62 of electric machine 10 and three adjacent stator segments 44 of a given stator module fit within arc 62. Although electric machine 10 will be described as using a rotor pole to stator pole ratio of four to three for descriptive purposes, this is not a requirement. Instead, any desired ratio between the number of rotor poles relative to stator poles may be used and still remain within the scope of the disclosure.

Arc 62 corresponds to one fourteenth of the diameter of electric machine 10 since four evenly spaced permanent magnets fit within arc 62 and electric machine includes a total of fifty-six permanent magnets 32 evenly spaced around rotor assembly 12. This means that there is space for a total of forty-two stator segments 44 around stator assembly 14 if stator assembly 14 is fully populated with stator segments evenly spaced at stator segment spacing 60. Therefore, an electric machine of this configuration with a full complement of forty-two stator segments 44 may have seven stator modules that each include six evenly spaced stator segments 44 as illustrated by electric machine 64 in FIG. 6.

As described above, electric machines in accordance with aspects of the disclosure may use less than a full complement of stator modules. Additionally, specific stator module designs and electric machine designs may make it difficult to maintain a constant stator segment spacing between the stator segments at the ends of adjacent stator modules. For example, the thicknesses of the stator module housings of two adjacent stator modules may be such that it is not possible to maintain a constant stator segment spacing between the stator segments at the ends of the adjacent stator modules. Therefore, specific electric machine and stator module designs, or the use of less than a full complement of stator modules within a particular electric machine design, may create a stator pole gap larger than the stator segment spacing between adjacent stator segments within the associated stator modules. This larger stator pole gap can lead to imbalances in the magnetic flux associated with the stator segments adjacent to the larger stator pole gap relative to the other stator segments in a stator module. These imbalances can cause inefficiencies in the operation of the electric machine.

Referring back to FIG. 1, electric machine 10 includes only six evenly spaced stator modules 40 with each stator module including only six stator segments 44. This results in a total of thirty-six stator segments within stator assembly 14 even though forty-two stator segments would fit in electric machine 10 if a full complement of stator segments were used with constant stator segment spacing 60. In other words, six of the potential forty-two stator segments are omitted in electric machine 10. This use of fewer than a full complement of stator segments 44 within stator assembly 14 results in a stator pole gap 66 between the stator segments at the ends of adjacent stator modules. This stator pole gap 66 is larger than the stator segment spacing 60 between adjacent stator segments within stator modules 40. In electric machine 10, stator pole gap 66 is twice the size of stator segment spacing 60 because six potential stator segments are omitted and the six stator modules are spaced equally around stator assembly 14. This larger stator pole gap 66 between the stator segments at the ends of adjacent stator modules may also cause a phase shift with regard to the relative positioning of the stator segments within adjacent stator modules. As mentioned above, bus bar 16 may be used to correct for this phase shifting as described in detail in the referenced PCT patent applications PCT/US2010/048027, and PCT/US2010/048028.

As mentioned above, the presence of larger stator pole gap 66 may cause imbalances in the magnetic flux associated with the energizing of the stator segments adjacent to the larger stator pole gap. These imbalances can lead to inefficiencies in the operation of the electric machine. In order to avoid these potential imbalances and in accordance with aspects of the disclosure, electric machine 10 may further include termination cores 68 that are spaced apart from adjacent stator segments 44 by stator segment spacing 60.

Figure 7:
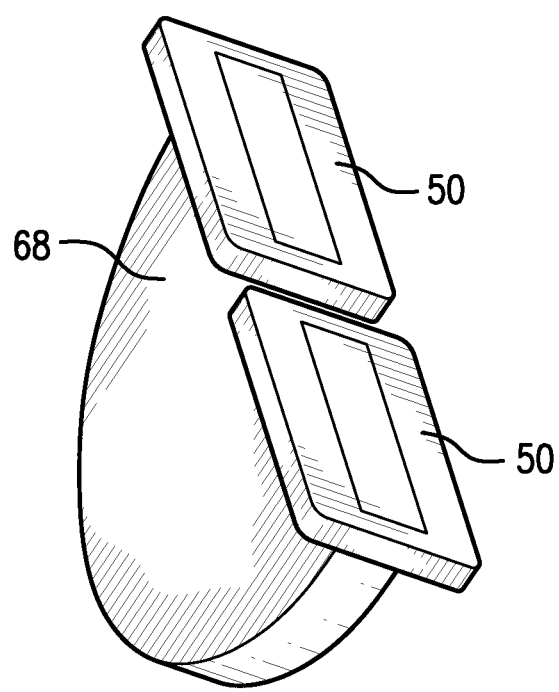
FIG. 7 is a perspective view of a termination core of FIG. 1 in accordance with aspects of the present disclosure.

Termination cores 68 may be similar in construction to cores 46 of stator segments 44. In this example, termination cores 68 are U-shaped cores formed from a low loss thin film soft magnetic material such as amorphous metal or nanocrystalline material in a manner similar to that described above for cores 46. As illustrated in FIG. 7, termination cores 68 may also include core bracelets 50 for enlarging the stator pole faces associated with termination cores 68.

In this example configuration, termination cores 68 are not active electromagnetic assemblies like stator segments 44. Instead, they may be passive magnetic cores that do not include coils for electromagnetically energizing termination core 68. Furthermore, termination cores 68 may be attached to, or included within, an associated stator module. Additionally, terminal cores may be provided at one or both ends of an associated stator module. Alternatively, termination cores 68 may be provide as separate components relative to the stator modules.

In accordance with aspects of the disclosure, termination cores 68 provide an additional magnetic flux return path for magnetic flux generated by energizing an adjacent stator segment 44. This additional flux path helps balance the magnetic flux associated with the energizing of an adjacent stator segment and virtually eliminates the negative effects associated with having a stator pole gap larger than the stator segment spacing. Therefore, the use of termination cores 68 allow for a wide variety of stator module configurations to be used in a given electric machine design without creating the negative effects associated with a stator pole gap that is larger than the stator segment spacing.

As illustrated best in FIG. 7, since termination cores 68 do not include coils, termination cores 68 may have shorter legs compared to cores 46 of stator segments 44. This allows termination cores 68 to be somewhat shorter than stator segments 44. This, along with the fact that termination cores 46 do not include coils, means that termination cores 68 can provide additional space that may be needed for other components in smaller diameter electric machine designs. For example, the stator module housings of adjacent stator modules may require enough space that the associated stator modules are not able to be placed close enough together to maintain the desired stator segment spacing from the last stator segment in the first stator module to the first stator segment in the next stator module. In this situation, a smaller termination core may be placed between the stator modules with the termination core being spaced apart from both of the stator segments and the ends of the adjacent stator modules by the stator segment spacing associated with the electric machine. This would allow the termination core to balance the magnetic flux associated with the energizing of both of the stator segments at the ends of the adjacent stator modules. This configuration is illustrated in FIG. 1 in which each stator module is separated from the next stator module by a termination core.

Figure 6:
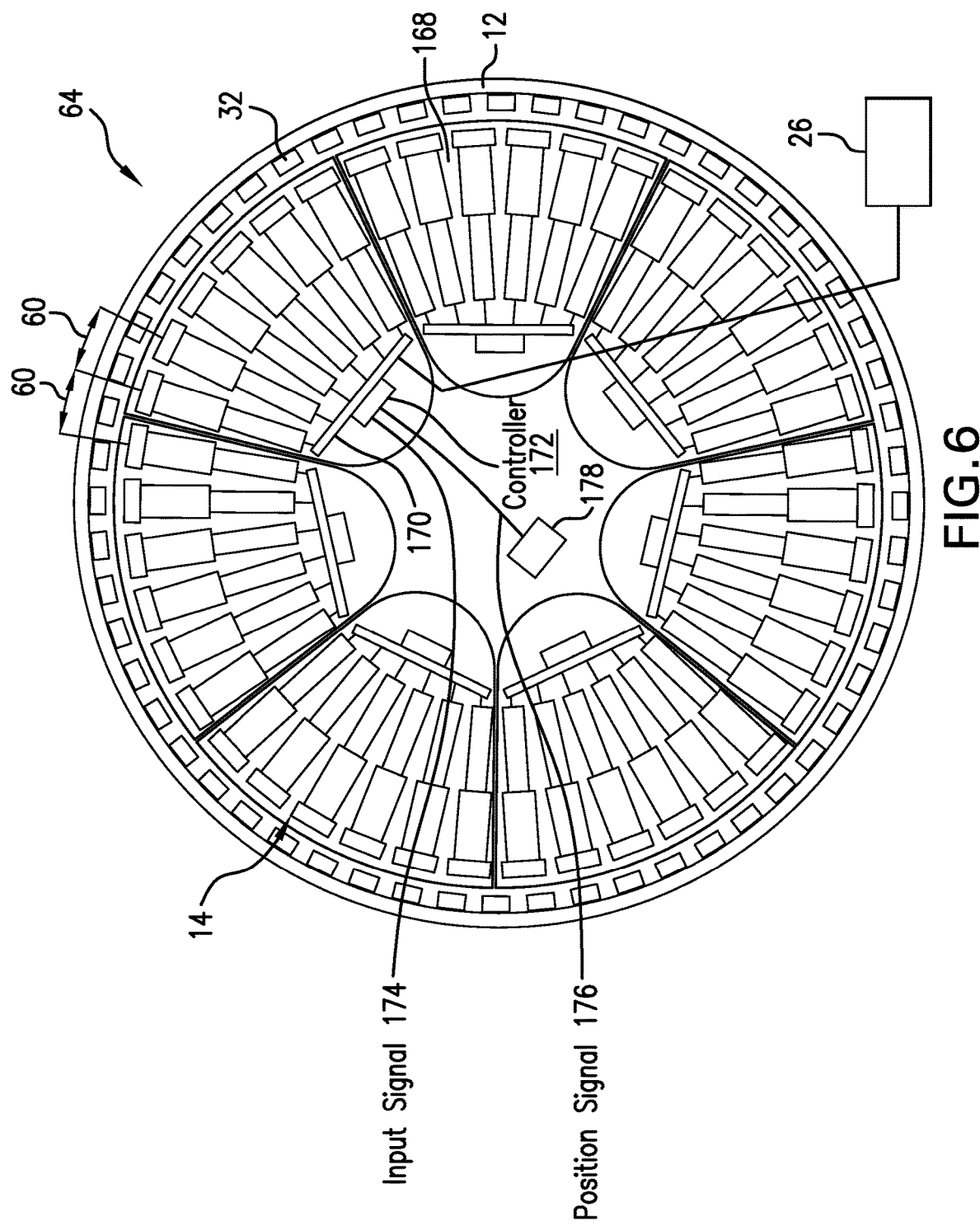
FIG. 6 is a schematic illustration of an electric machine including stator modules and stator segments in accordance with aspects of the present disclosure.

As mentioned above, the use of termination cores allows for a wide variety of configurations for a given electric machine design. For example, an electric machine design that uses rotor arrangement 12 and stator modules 40 described above for electric machine 10 may use anywhere from one to seven stator modules. As described above for electric machine 64 and as illustrated in FIG. 6, no termination cores would be required if seven stator modules were used. If only one stator module were used, a termination core may be used at both ends of the stator module and the entire remainder of the stator assembly would be vacant. If any other number of stator modules is used, the stator modules may be grouped immediately adjacent to one another and a termination core may be placed at both ends of the grouping. Alternatively, different groupings of stator modules could be placed in various positions around the stator assembly. In this case, termination cores may be placed at both ends of each grouping.

Although stator modules 40 have been described as including six stator segments and electric machine has been described as a three-phase machine, these are not requirements. Instead, any desired number of stator segments may be included in a stator module and the electric machine may have any desired number of phases.

Figure 8:
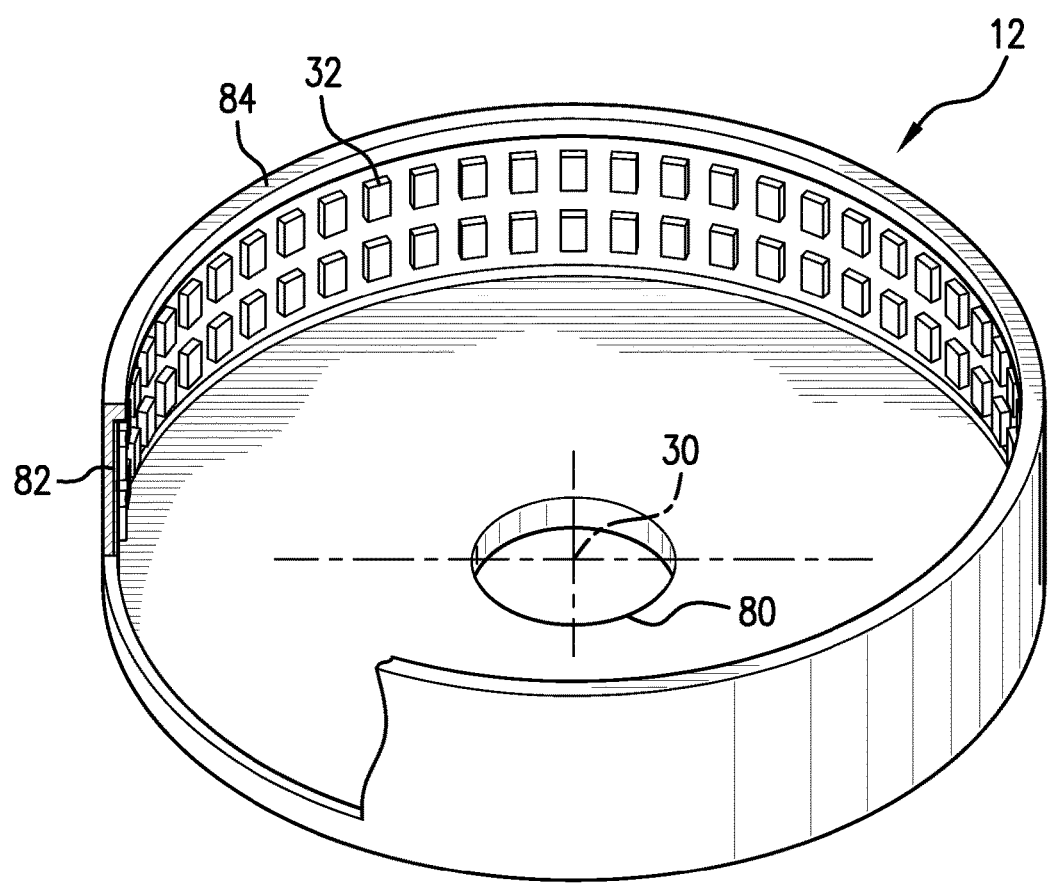
FIG. 8 is a perspective view of the rotor assembly of FIG. 1 in accordance with aspects of the present disclosure.

Referring now to FIGS. 1 and 8, a rotor assembly and methods of making a rotor assembly in accordance with aspects of the disclosure will be described in more detail. As shown best in FIG. 8, rotor assembly 12 may be shaped very much like a conventional automotive brake drum. With this configuration, rotor assembly 12 surrounds the outer perimeter of stator assembly 14. Bearings 80, or some other suitable arrangement, may be used to support rotor assembly 12 for rotation about rotational axis 30.

Rotor assembly 12 may include a back iron 82 and a rotor housing 84. Back iron 82 may be an iron alloy band having a thickness that is capable of carrying the magnetic flux associated with permanent magnets 32. Alternatively, rotor assembly 12 may be provided without including a back iron 82. In this case, rotor housing 84 may be made from a magnetic material and the cast rotor housing may be used as the back iron to provide a magnetic return path for the rotor poles.

Figure 9:
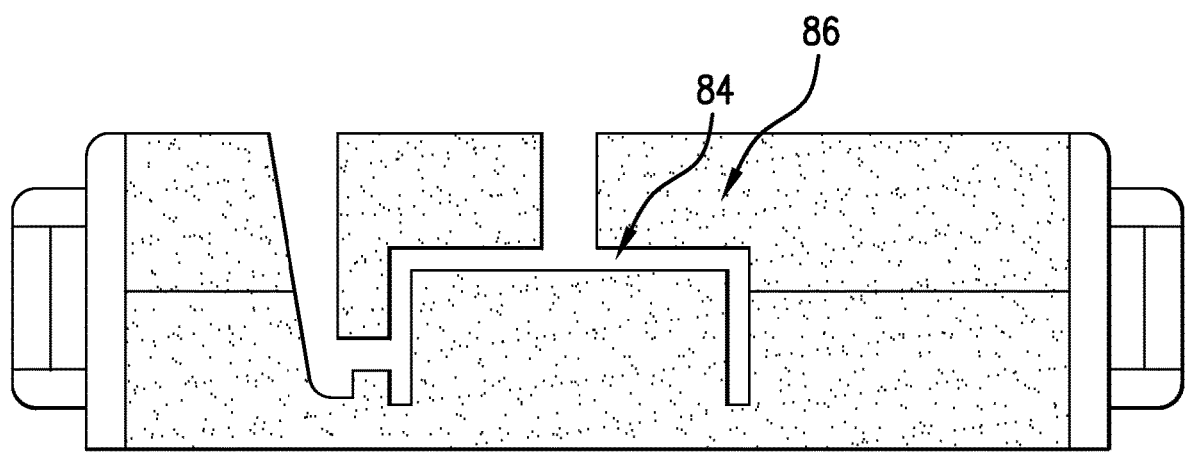
FIG. 9 is a perspective view of a molding arrangement for molding the rotor housing of the rotor assembly of FIG. 8 in accordance with aspects of the present disclosure.

In a method of making a rotor assembly 12 in accordance with aspects of the disclosure, a molding arrangement 86 may be used to cast rotor housing 84 as illustrated in FIG. 9. If a separate back iron 82 is used, back iron 82 may be supported within molding arrangement 86 and rotor housing 84 may be cast around back iron 82. If the cast rotor housing itself is to be used for the back iron magnetic flux return path without the use of a separate back iron, rotor housing 84 may be cast without the use of back iron band 82. Once rotor housing 84 is formed, molding arrangement 86 may be removed and the inner surface of rotor housing 84 (onto which the rotor poles are to be formed or placed) may be machined to precise tolerances if desired. A bearing support 88 or some other form of supporting arrangement may also be formed and/or machined into rotor housing 84.

The use of permanent magnets for the rotor poles of the electric machine may result in very large magnetic forces between the rotor and stator assemblies when the rotor assembly is being positioned over or around the stator assembly during the assembly of the electric machine. These large magnetic forces may tend to cause unwanted contact and potential damage to the stator and/or rotor assemblies during the assembly process. Bearing support 88 may be a relatively long bearing support that fits over a relatively long axle on stator assembly 14. The use of a relatively long axle and relatively long bearing support may assist in maintaining the proper alignment between the stator assembly and the rotor assembly to prevent potentially damaging contact between the rotor and stator assemblies during the assembly of the electric machine.

Once rotor housing 84 has been molded, rotor poles may be formed or placed in rotor housing 84. In some examples, a magnet spacing track 90 may be used as a jig to precisely position the permanent magnets in desired locations in the rotor housing. Magnet spacing track 90 may be a plastic strip that fits snuggly against the inside surface of rotor housing 84. Magnet spacing track 90 may have cut outs for precisely positioning each permanent magnet 32 within rotor housing 84. Magnet spacing track 90 may also be adhered to rotor housing 84 along with the permanent magnets and remain part of overall rotor assembly 12.

The material used to cast rotor housing 84 may be any suitable and readily providable casting material. Example casting materials can include casting materials having good thermal conductivity, good structural strength, and appropriate magnetic characteristics. In the case in which the casting material of the rotor housing is used as the back iron, the casting material may be a cast iron with good magnetic permeability. Grey cast irons are an example of a suitable cast iron and they are categorized by their mechanical strength in ASTM including ASTM-20, ASTM-25, ASTM-30, ASTM-35, ASTM-40, ASTM-50, and ASTM-60. Grey cast irons with a higher mechanical strength may be used to provide a lighter weight rotor housing for a given application.

In the case in which a separate back iron band 82 is used, an example material is an aluminum alloy casting material. The use of aluminum alloy for the rotor housing may provide an even lighter weight rotor assembly and good thermal properties. Regardless of the casting material used, the casting or molding process may also include forming various features into rotor housing 84 such as cooling fins, mounting points for a wheel, or any other desired features. Various additional features may also be machined into the rotor housing after the molding process is complete.

As mentioned above, electric machines in accordance with the disclosure may take the form of a wheel hub electric machine. In this type of application, the weight of the electric machine and the cost of the various components making up the machine are very important. Casting the rotor housing as described above provides a very strong and light weight rotor assembly that is very economical when produced in relatively high volumes. In addition, as described above for electric machine 10, the same rotor assembly may be used for a wide variety of electric machine configurations by varying the number of stator modules included in the electric machine. This potentially allows the rotor assembly to me made in even higher volumes further improving the cost effectiveness of electric machines designed in accordance with the disclosure.

Figure 10:
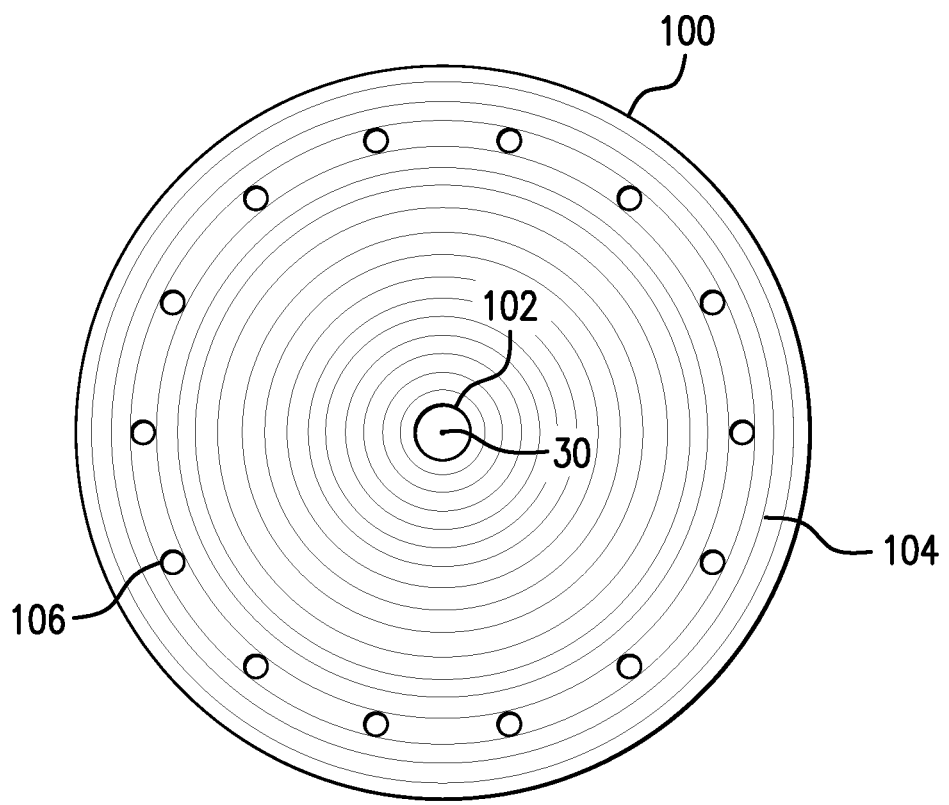
FIG. 10 is a schematic illustration of a stator module support arrangement in accordance with aspects of the present disclosure.
Figure 11:
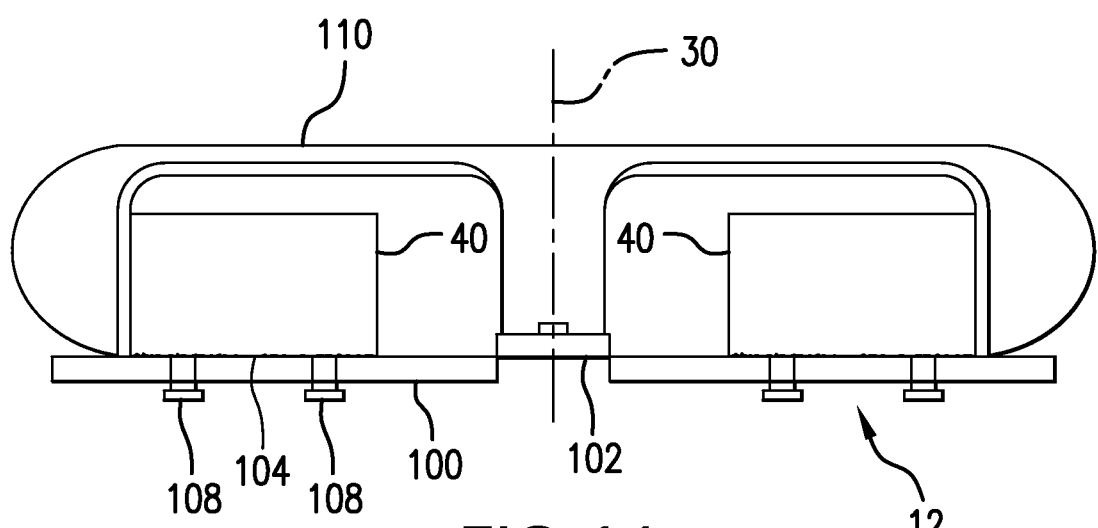
FIG. 11 is a cross sectional view of a stator assembly and a positioning jig used to position and attach the stator modules to the stator module support arrangement of FIG. 10 in accordance with aspects of the present disclosure.

In a radial gap electric machine such as electric machine 10 described above, the size of the radial gap between the rotor pole faces and the stator pole faces is very significant to the performance of the electric machine. Maintaining a consistent radial gap for all of the stator poles within the electric machine is also very important for balancing the magnetic flux and ensuring the optimum performance of the electric machine. Since electric machines in accordance with the disclosure may include a plurality of independent stator modules, the precise positioning and attaching of each of the stator modules to the stator assembly is critical. Referring now to FIGS. 10 and 11 a method of attaching the stator modules to the stator assembly in accordance with aspects of the disclosure will be described in more detail.

FIG. 10 illustrates a stator module support arrangement 100 for use in stator assembly 14 of electric machine 10 in accordance with aspects of the disclosure. Stator module support arrangement 100 may include a rotor support arrangement 102 that is configured to allow rotor assembly 12 to be attached to stator module support arrangement 100 for rotation about rotational axis 30 of electric machine 10. Rotor support arrangement 102 may include an arrangement for supporting bearing 80 or any other suitable arrangement for supporting rotor assembly 12 for rotation about rotational axis 30.

Stator module support arrangement 100 may also include a position locking surface finish 104 and mounting points 106 that are configured to receive stator modules 40. As shown best in FIG. 11, stator modules 40 may also include position locking surface finish 104. Position locking surface finish 104 may provide a fine scale indexing feature for assisting in holding the stator modules in the desired location as they are being positioned on stator module support arrangement 100. These indexing features may be configured to allow very small incremental movements between stator modules 40 and stator module support arrangement 100 while stator modules 40 are being positioned on stator module support arrangement 100. The position locking surface finishes may also provide an arrangement for locking stator modules 40 in place once they are secured to stator module support arrangement 100 using bolts 108 or any other suitable securing arrangement. In some examples, position locking surface feature 104 may be a knurled surface finish. Alternatively, position locking surface features 104 may be a series of fine scale concentric ridges, cross-hatches, or lines.

In order to precisely locate stator modules on stator module support arrangement 100, a positioning jig 110 may be used as illustrated in FIG. 11. Positioning jig 110 may be temporarily attached to stator support arrangement 100 using rotor support arrangement 102. This allows positioning jig 110 to be used to precisely locate stator modules 40 on stator support arrangement 100 relative to rotor support arrangement 102. Since rotor support arrangement 102 is also used to support rotor assembly 12 once electric machine 10 is fully assembled, this approach allows positioning jig 110 to precisely locate the positions of stator modules 40 relative to the final positioning of the rotor poles or permanent magnets 32 once electric machine 10 is fully assembled. After stator modules 40 have been secured in the proper positions using bolts 108 or any other suitable securing arrangement, positioning jig 110 may be removed and rotor assembly 12 may be attached to stator assembly 14.

Figure 12:
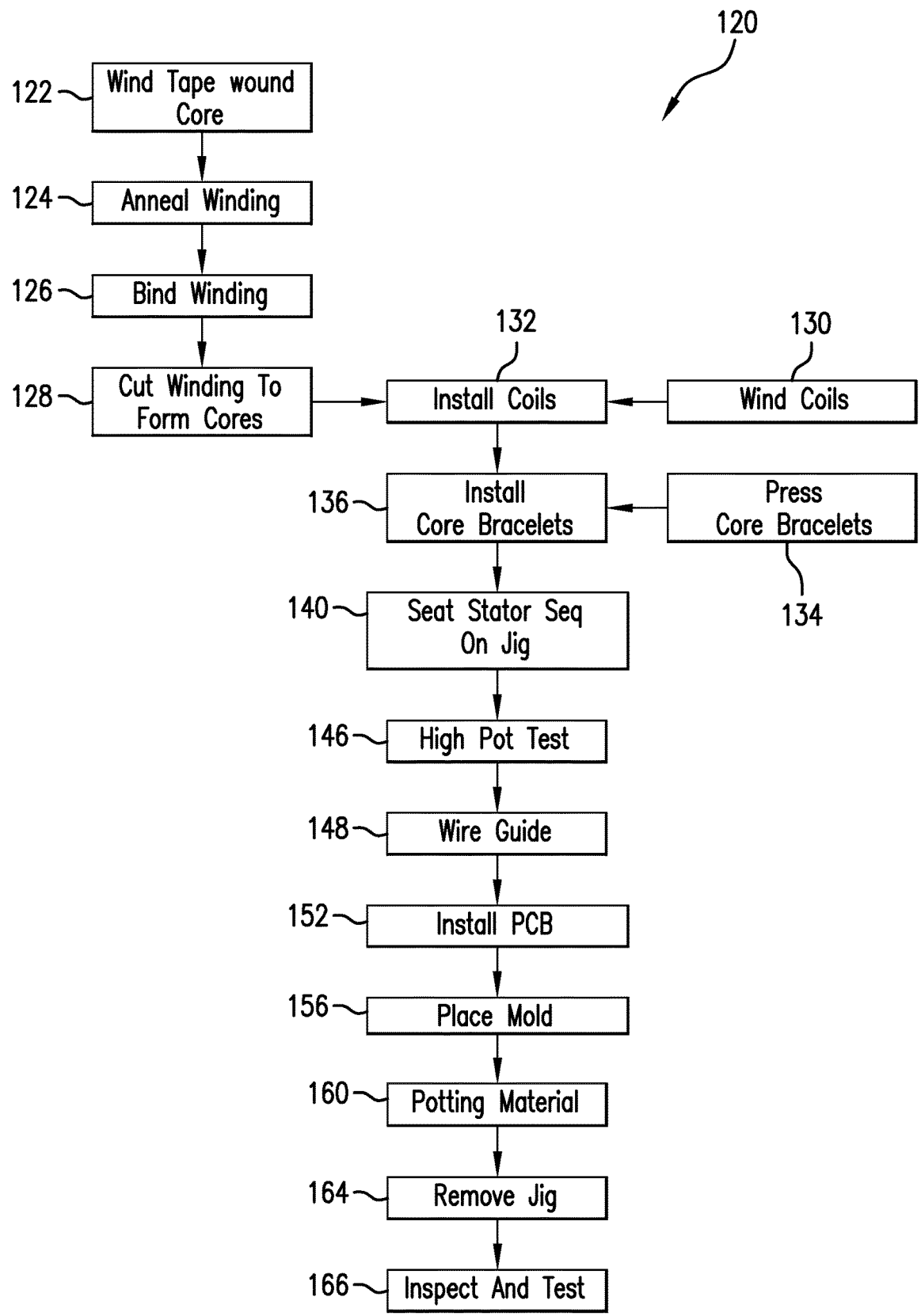
FIG. 12 is a flow chart illustrating various steps that may be included in the process of making a stator module in accordance with aspects of the present disclosure.

Referring now to FIG. 12, a method 120 of making a stator module in accordance with aspects of the disclosure will be described in more detail with reference to stator module 40 described above. Although stator module 40 has been described as including six stator segments, this is not a requirement of the disclosure. Instead, the stator modules may include any number of stator segments and still remain within the scope of the disclosure.

Each of the stator segments 44 of stator module 40 may be assembled with stator segments 44 including tape wound core 46, two windings or coils 48, and two core bracelets 50. As described above with reference to FIGS. 4 and 5, each individual one-piece magnetic core 46 may be formed by winding a continuous ribbon of thin film soft magnetic material into a desired shape as indicate in step 122 of FIG.

12. In this example, the shape is a generally oval shape as indicated by winding 55 in FIG. 4. Once wound into the desired shape, winding 55 may be annealed to remove any stresses that may have been caused by the winding process as indicated in step 124 of method 120. Then, as indicated in step 126, winding 55 may be saturated with an adhesive material such as a very thin wicking epoxy that may be heat cured to bind winding 55 into a rigid piece. Winding 55 may then be cut into two U-shaped pieces that each may provide one of magnetic cores 46 as indicated in step 128.

Since tape wound magnetic cores 46 include legs that have a consistent cross section, the electromagnetic windings or coils 48 may be slid over each of the legs of core 46 after coils 48 have already been formed or wound as indicated by steps 130 and 132 of method 120. This allows each individual coil 48 to be economically wound on a high volume and very simple winding machine. This ability to wind coils 48 individually and prior to being installed onto cores 46 eliminates the need for the use of expensive and complicated winding machines to perform the complex winding processes that are typically required to manufacture conventional electric machines.

In this example, round copper wire with a dielectric coating may be used to form coils 48. However, it should be understood that any desired electrical conductor material and configuration may be used. This includes wire formed from electrically conductive material other than copper such as aluminum. This also includes wire stock having any desired cross sectional shape such as square wire.

As mentioned above, core bracelets 50 may be formed from thin film soft magnetic material, powdered metal, or any other desired magnetic material. In some examples, core bracelets 50 are formed from magnetically permeable metal powder that is pressed into the desired shape as indicated in step 134. As illustrated best in FIG. 3, core bracelets 50 may have a uniform thickness perpendicular to stator pole face 51. This use of a uniform thickness allows core bracelet 50 to be easily and economically pressed from a powdered metal material.

With coils 48 placed on core 46, core bracelets 50 may be installed around the ends of the legs of U-shaped core 46 as indicated by step 136 such that the bottom surface of core bracelet 50 is flush with the stator pole face 51 of core 46. Core bracelets 50 may be configured to fully surround the ends of U-shaped core 46 to provide an enlarged overall stator pole face 51 at each end of core 46. Each core bracelet 50 may be adhered to the sides of the end of the respective leg of core 46 using any suitable adhesive material. Core bracelets 50 may also be adhered to the bottom portions of coils 48 and coils 48 may be adhered to core 46 to provide additional support to core bracelets 50 during the assembly of stator module 40.

The use of core bracelets 50 enlarges stator pole face 51 and reduces the space between adjacent stator pole faces within stator module 40. This reduced spacing between adjacent stator pole faces improves the efficiency of an electric machine that uses this configuration by enlarging the flux linkage area of the stator poles.

As mentioned above, the use of core bracelet 50 also allows the ends of core 46 to extent through core bracelets 50 so that the ends of core 46 make up at least portions of stator pole face 51. This allows stator pole face 51 to include all of the cut ends of each layer of the tape wound material making up core 46. By having all of the ends of the layers of the tape wound core material extend to stator pole face 51, each layer of tape wound material provides a continuous and uninterrupted magnetic flux path from one stator pole face of the U-shaped core to the opposite stator pole face of the U-shaped core. In other words, for the portions of the stator pole face that include the cut ends of the layers of tape wound core material, the magnetic flux does not need to transition from one magnetic material to another or through multiple layers of magnetic material. This configuration provides the best possible magnetic flux path between the two stator pole faces of the magnetic core for the portions of the stator pole face that include the cut ends of the layers of tape wound core material.

Figure 13:
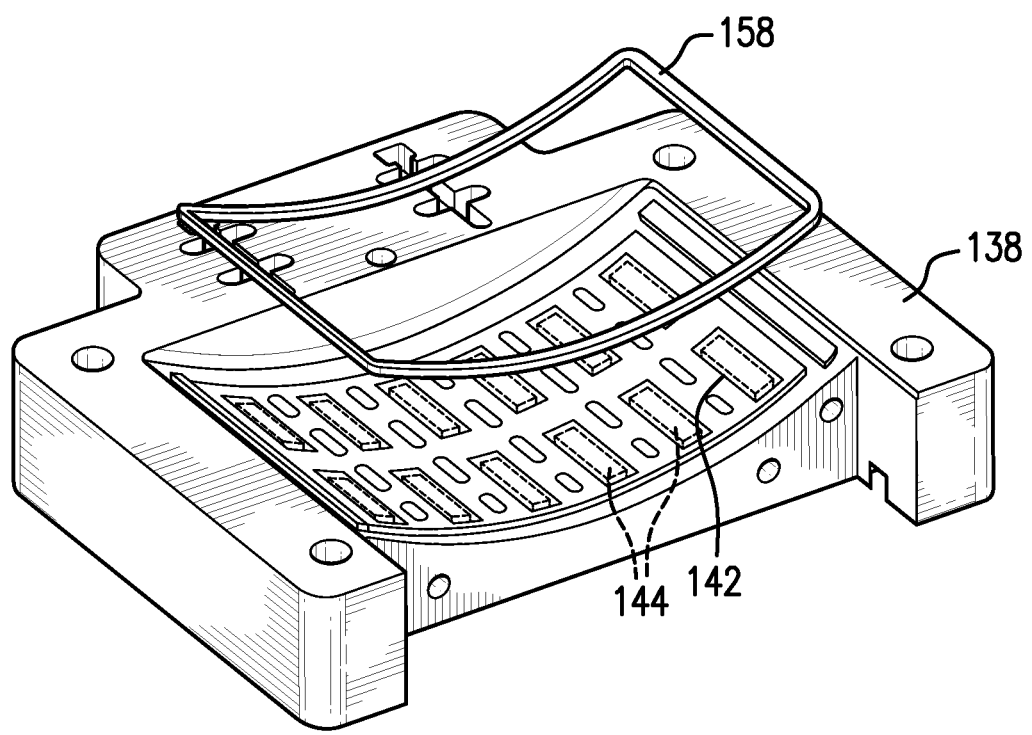
FIG. 13 is a perspective view of a temporary support arrangement for use in the process of making a stator module in accordance with aspects of the present disclosure.

In accordance with aspects of the disclosure, six assembled stator segments 44 may be seated or supported on a temporary support 138 as indicated in step 140 of method 120. FIG. 13 illustrates an example of temporary support 138 that includes a stator segment orienting surface 142 for each stator segment 44. Each stator segment orienting surface 142 is configured to precisely orient an associated stator segment 44 in a desired orientation relative to the other stator segments of the stator module that is being constructed when the stator segments are positioned and supported against their associated stator segment orienting surfaces as shown best in FIG. 14. Any suitable arrangement may be used to hold stator segments 44 in place during the construction of stator module 40 including additional supporting arrangements or clamping arrangements.

In accordance with aspects of the disclosure, temporary support 138 may be a magnetic jig that also includes a plurality of magnets 144 located below each stator segment orienting surface 142. With this configuration, magnets 144 provide a magnetic force that may hold a stator segment 44 against stator segment orienting surface 142 throughout the construction of a stator module 40 using method 120. Magnets 144 may be permanent magnets similar to magnets 32 used in rotor assembly 12. Alternatively, magnets 144 may be any other type of magnet including electromagnets that may be controlled by an external power source.

Temporary support 138 may be formed from any suitable material that is capable of properly supporting stator segments 44 during the construction of stator modules 40. In an example in which temporary support 138 is a magnetic jig, temporary support 138 may be machined from a non-magnetic material such as an aluminum alloy.

At some point during the process of constructing stator module 40, a Hi-Pot test may be performed on each stator segment 44 to insure that there are no shorts between the coils and the magnetic core as indicate in step 146 of method 120. This step may be done after coils 48 are installed on cores 46. Preferably, this test would be done before the molding steps that will be described hereinafter are performed and any stator segments that fail the Hi-Pot test would be rejected and replaced with passing stator segments.

Figure 14:
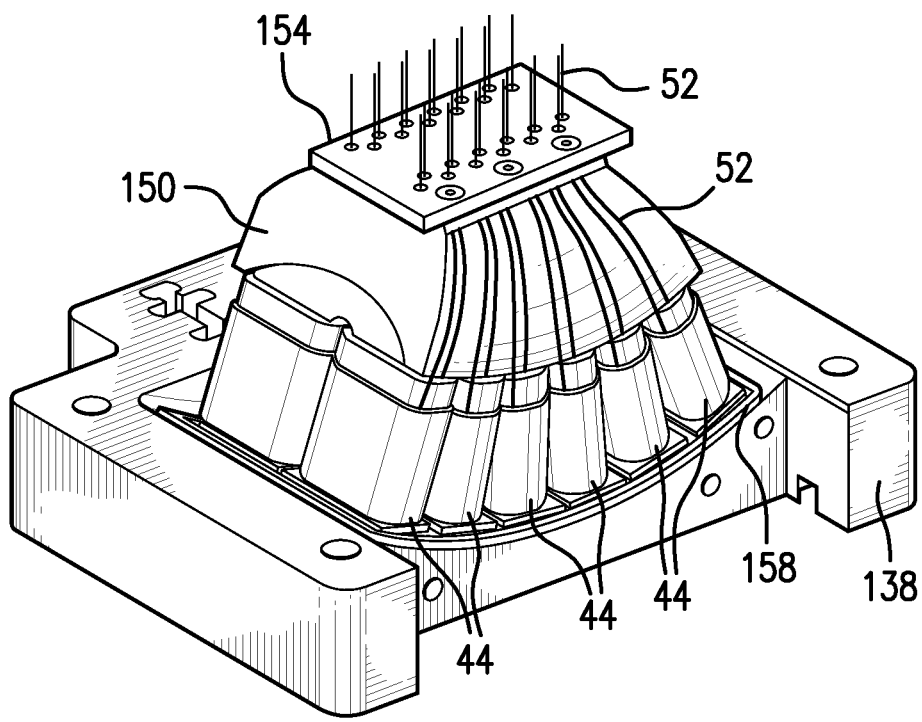
FIG. 14 is a perspective view of the temporary support arrangement of FIG. 13 with components placed on the temporary support arrangement in accordance with aspects of the present disclosure.

As indicated by step 148, method 120 may include the step of installing a wire guide arrangement 150 over the tops of stator segments 44 as illustrated in FIG. 14. Wire guide 150 may further support stator segments 144 in their desired orientations relative to one another. Wire guide 150 may also be used to hold electrical leads 52 of coils 48 in desired positions for further assembly of stator module 40.

Method 120 may also include a step 152 of installing an electrical connection arrangement 154 for electrically interconnecting electrical leads 52 of coils 48. As illustrated best in FIG. 14, electrical connection arrangement 154 may be a printed circuit board (PCB) that may be positioned over wire guide 150 and electrical leads 52 may be soldered to electrical contact points on the PCB. PCB or electrical connection arrangement 154 may also include electrical connectors (not shown) that may be used to electrically connect stator module 40 to electrical conductors 54 described above for electric machine 10. As described above and as illustrated in FIG. 1, electric conductors 54 may be in electrical communication with controller 18 and may be associated with the various phases of electric machine 10.

With the above described configuration, different examples of the PCB may be used to electrically interconnect electrical leads 52 of coils 48 and electrical conductors 54 in a variety of different desired manners depending on the specific requirements for the electric machine. For example, in a three phase electric machine, a six stator segment stator module would include a total of twelve coils 48 with four of these coils being associated with each phase. In a relatively low voltage version of this type of electric machine, the PCB may be configured to electrically interconnect each group of four coils associated with each phase in parallel. In a relatively higher voltage version of this type of electric machine, the PCB may be configured to electrically interconnect each group of four coils associated with each phase in series. In a relatively medium voltage version of this type of electric machine, the PCB may be configured to electrically interconnect each group of four coils associated with each phase such that there are two parallel groups of two coils connected in series. Therefore, a plurality of different stator module and electric machine configurations may be obtained by simply using different PCB configurations to interconnect electrical leads 52 of coils 48 without varying any other components within stator module 40. This provides the advantage of being able to use many of the same components to construct a variety of electric machine configurations.

Figure 15:
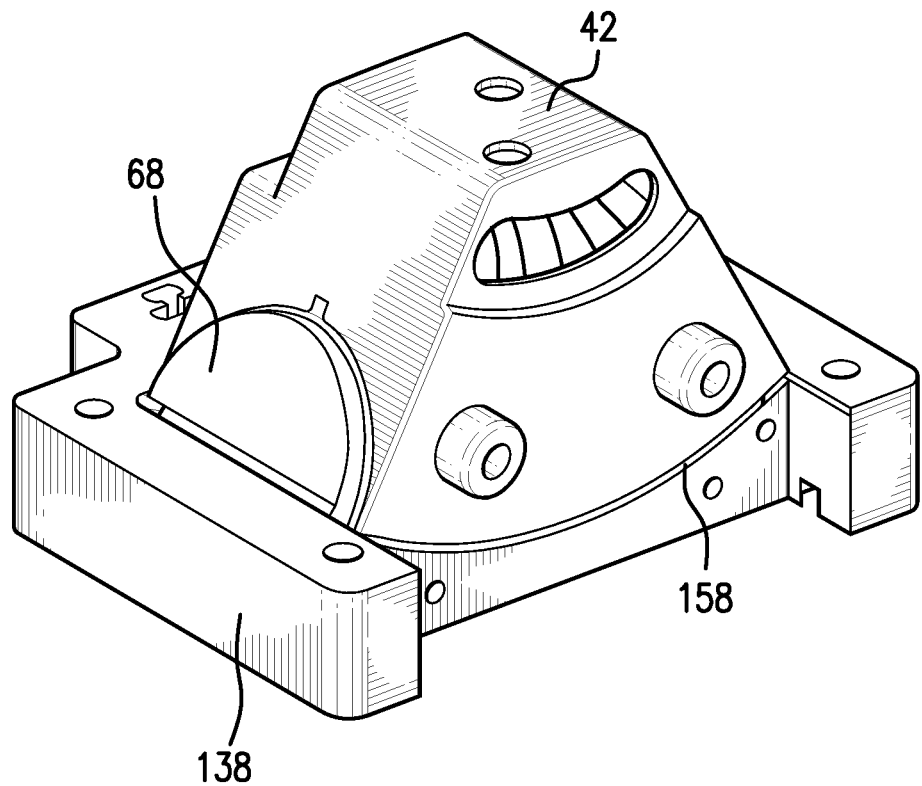
FIG. 15 is a perspective view of the temporary support arrangement of FIG. 14 with additional components placed on the temporary support arrangement in accordance with aspects of the present disclosure.

As indicated by step 156, a mold may be placed around stator segments 44 and the other components assembled on temporary support 138 as best illustrated in FIG. 15. In some examples, the mold may be stator module housing 42 that remains part of stator module 40 after method 120 is complete. Alternatively, the mold may be a mold that is removed after stator module 40 is formed using method 120. A gasket 158 may be used to seal the joint between the mold and temporary support 138 and the mold may be clamped to temporary support 138. In the case in which the mold is stator module housing 42, a termination core 68 or termination core support arrangement may be attached to or included as part of stator module housing 42 if the electric machine design includes the use of a termination core associated with the stator module being constructed.

Stator module housing 42 may be made from any desired material using any desired method. Preferably, the material used would have a high thermal conductivity to assist in the removal of heat from the stator cores and windings as will be described in more detail hereinafter. In some examples, stator module housing 42 may be die cast using an aluminum alloy. Alternatively, stator module housing may be machined from a desired material. If the material used to form stator module housing 42 is electrically conductive, stator module housing 42 may be coated with a dielectric material. For example, in the case in which the stator module housing is die cast from an aluminum alloy, stator module housing may be powder coated with a dielectric material to electrically isolate stator module 42 from other components of the stator modules such as coils 48.

Figure 16:
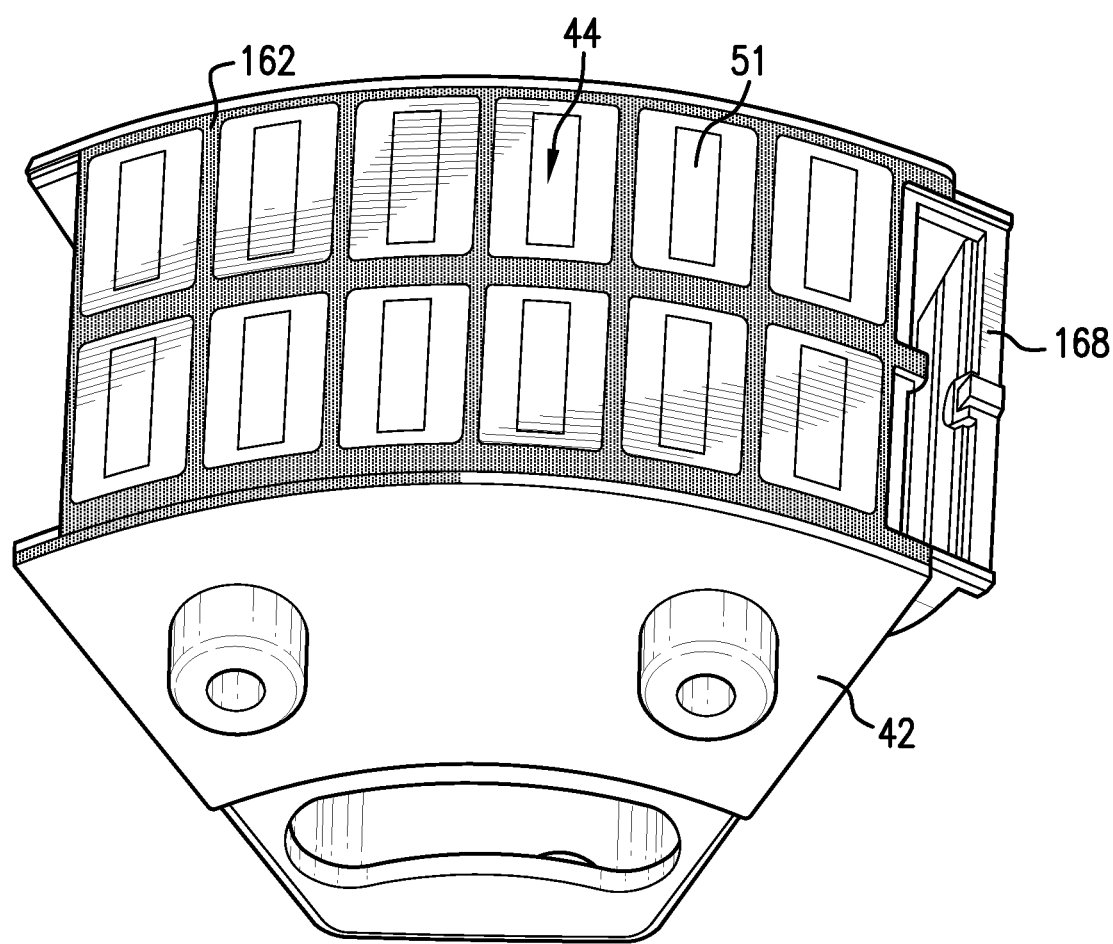
FIG. 16 is a perspective view of a stator module constructed in accordance with aspects of the present disclosure.

As indicated in FIG. 16 and step 160 of method 120, a potting material 162 may be used to fill the mold to form stator module 40 such that potting material 162 supports stator segments 44 in their desired orientations. In some examples, potting material 162 is an electrically nonconductive and thermally conductive encapsulating material. This encapsulating material may be any suitable and readily providable material including, but not limited to, epoxy and filler mixtures and mixtures of pourable powders. In the case of mixtures of pourable powders, the mixture may include a heat activated adhesive powder and a filler. The filler for either the epoxy mixture or pourable powder may be any desired filler. Example fillers can include light weight and thermally conductive (e.g., alumina coated aluminum powder).

If an epoxy and filler mixture is used for potting material 162, the ratio of the filler to epoxy may be limited by the viscosity of the mixture. However, vacuum may be used to assist in filling the mold with the encapsulating material. The use of pourable powder mixtures may provide the potential advantage of being able to use higher concentrations of filler while maintaining the ability to pour the powder mixture into the mold. The mold may be vibrated to assist in the complete distribution of the powder mixture throughout the mold. Once filled, the mold may be heated to activate the epoxy or adhesive power thereby encapsulating and supporting the various components of the stator module within the mold.

With the above described configuration, the thermally conductive potting material 162 provides a direct thermal path from the stator segments 44 to the stator module housing 42. The stator module housing 42 may then be in direct contact with stator module support arrangement 100 of stator assembly 14 as described with reference to FIG. 11. When electric machine 10 is in use, stator module support arrangement 100 may be exposed to the external environment to dissipate heat away from the stator segments 44. The exterior surface of stator module support arrangement 100 may also be provide with fins or other heat dissipating devices such as a liquid cooling system if desired.

As indicated in step 164 of method 120, temporary support 138 may be removed from stator module 40 after potting material 162 has cured. Stator module 40 may then be cleaned, inspected and tested as indicated by step 166 to ensure stator module 40 is functioning properly. By using method 120 as described above, potting material 162 may be the only material structurally supporting stator segments 44 in their desired orientation within stator module 40 after temporary support 138 has been removed.

Although electric machine 10 of FIG. 1 has been described as including a controller 18 that is configured to control all of the stator modules of the electric machine, this is not a requirement. Instead, each stator module may include its own separate controller. Referring back to FIG. 6, electric machine 64 may include seven stator modules 168 that are similar in construction to stator modules 40. However, in this implementation, each stator module 168 may include a PCB 170 similar to the PCB described above with reference to FIG. 14. Each PCB 170 may include a stator module controller 172 that regulates the operation of each stator module 168 based on an input signal 174 and a position signal 176. The input signal 174 can include a throttle signal, for example, in the case where the electric machine 64 is implemented in a vehicle, motorcycle, scooter, or the like. Electric machine 64 may also include a position detecting arrangement 178 for detecting the position of stator modules 168 relative to the rotor magnets 32. Position detecting arrangement 178 generates position signal 176 used by the stator module controller 172 and controller 172 can regulate power provided to the stator module 168 from power source 26 when electric machine 64 is operating in a motor mode. Stator modules 168 may generate power that can be provided to, and stored in the power source 26, when the electric machine 64 is operating in a generator mode. This configuration eliminates the need for a bus bar as described above and only power and the signal input and position signal need to be provided to each stator module 168.

Figure 17:
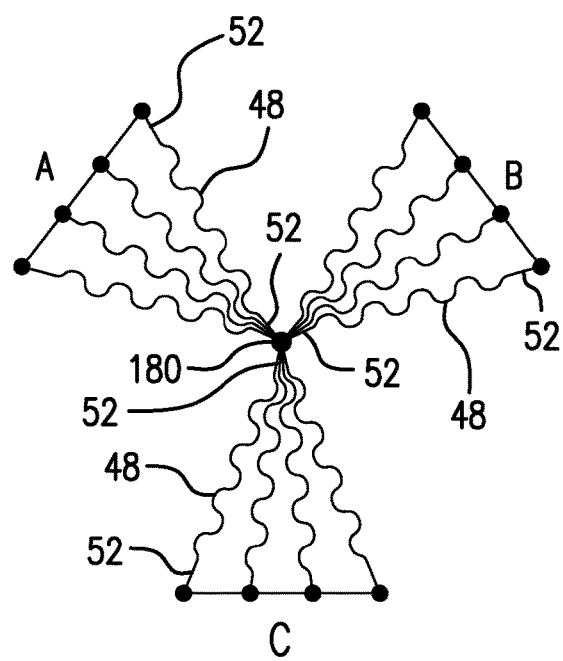
FIG. 17 is a schematic illustration of a first winding pattern and electrical configuration for interconnecting the windings of an electric machine in accordance with the present disclosure.

In a three-phase version of an electric machine in accordance with the disclosure such as electric machine 10 of FIG. 1, windings 48 of each stator module 40 may be electrically interconnected in a conventional wye configuration as illustrated in FIG. 17. In this example, there may be six stator segments 44 and twelve windings 48 in each stator module 40 with four windings being associated with each of the three phases; Phase A, Phase B, and Phase C. As illustrated in FIG. 17, one electric lead 52 of each of the twelve windings may be connected to a common center tap 180 and these electrical interconnections may be accomplished using electrical conductors on PCB 154. The other electric leads 52 of the four windings 48 associated with each of the three different phases may also be interconnected with one another using electrical conductors on PCB 154. As mentioned above, controller 18 may be electrically connected to each grouping of windings that are associated with each phase using the electrical conductors 54 and portions of bus bar 16 associated with the respective phases. Since each stator module associated with electric machine 10 may be configured in this manner, this overall arrangement for electrically connecting windings 48 of electric machine 10 may provide a highly parallel configuration that results in a relatively low voltage example of an electric machine that may be desirable for certain applications. Alternatively, multiple windings associated with a given phase may be connected in series as described above.

Although the arrangement of using a conventional wye configuration with a common center tap described immediately above may provide a highly parallel, relatively low voltage electric machine, the use of a common center tap 180 may allow ring currents to occur within the windings connected to the common center tap. If present, these ring currents may cause some efficiency losses in the electric machine.

Figure 18:
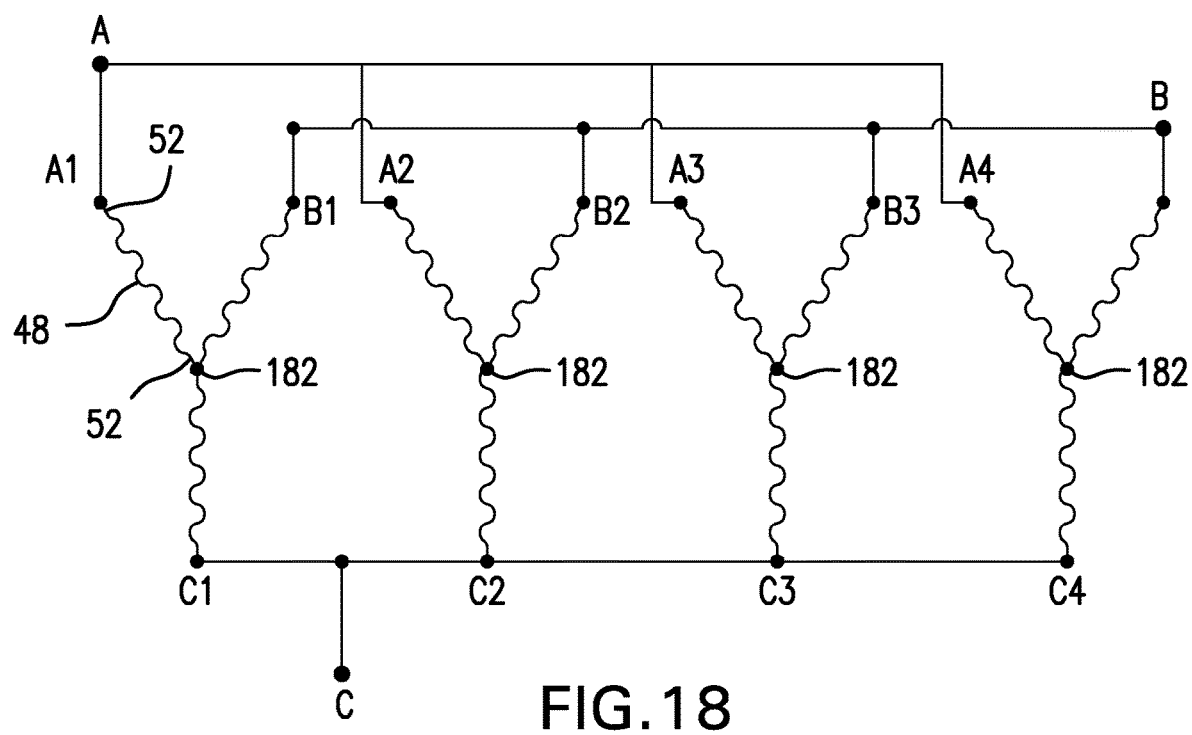
FIG. 18 is a schematic illustration of a second winding pattern and electrical configuration for interconnecting the windings of an electric machine in accordance with the present disclosure.

In accordance with another aspect of the disclosure, windings 48 of electric machine 10 may be electrically connected in a way that helps reduce the potential for creating ring currents. Since each winding 48 is independently wound rather than being series wound like most conventional electric machines, windings 48 may be electrically interconnected in a wide variety of different configurations as mentioned above. FIG. 18 illustrates one example of a configuration that may reduce the potential for ring currents within the interconnected windings of a stator module. In this example, multiple center taps 182 may be provided on PCB 154 and only one lead 52 of one winding 48 from each phase may be connected to each center tap 182 using electrical conductors on PCB 154. The other leads 52 of each winding 48 may be electrically interconnected with the other leads 52 of the other windings 48 of the same phase using electrical conductors on PCB 154. Each group of windings that are associated with each phase may be electrically connected to controller 18 using electrical conductors 54 and portions of bus bar 16 as described above.

Figure 19:
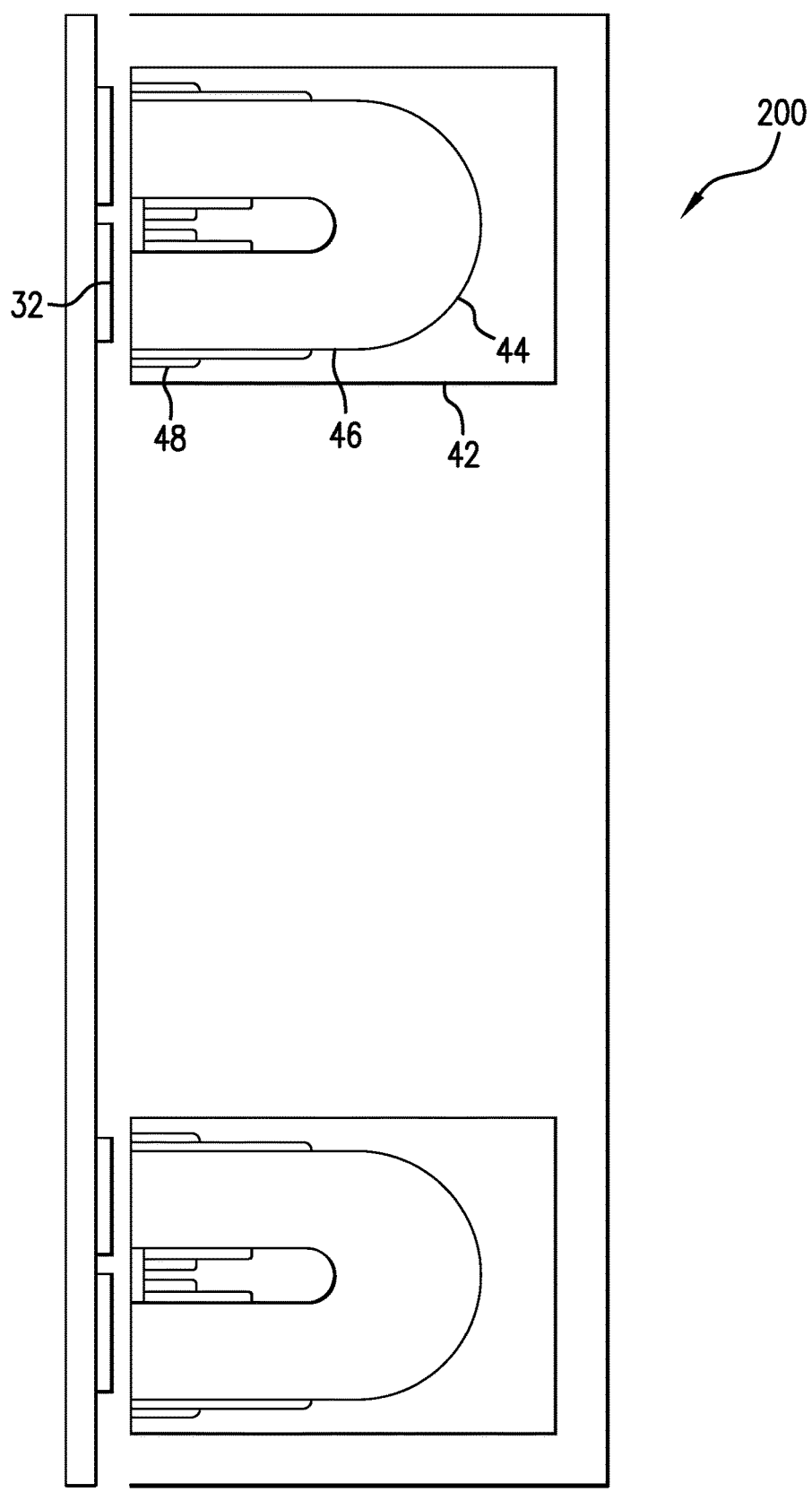
FIG. 19 is a schematic illustration of an electric machine including stator modules and stator segments in accordance with aspects of the present disclosure.

A number of implementations of the present disclosure have been described. Nevertheless, it should be understood that various modifications may be made without departing from the spirit and scope of the present disclosure. For example, although the implementations described above have described the electric machine as being a radial gap machine, this is not a requirement. FIG. 19 illustrates an axial gap electric machine 200 designed in accordance with the disclosure. Accordingly, other implementations are within the scope of the following claims.

Listing of Reference Numerals

10 Electric Motor
12 Rotor Assembly
14 Stator Assembly
16 Bus Bar Module
18 Controller
20 Input Signal
22 Position Signal
24 Position detecting Arrangement
26 Power Source
28 Radial Gap
30 Rotational Axis
32 Permanent Magnets
40 Stator Module
42 Stator Module Housing
44 Stator Segment
46 Core
48 Coils
50 Core Bracelet
51 Stator Pole Face
52 Electrical Leads
54 Electrical Conductors
55 Windings
56 Lines
57 U-shaped Layer
58 Arrow
60 Stator Segment Spacing
62 Arc
64 Electric Machine
66 Stator Pole Gap
68 Termination Core
80 Bearing
82 Back Iron
84 Rotor Housing
86 Molding Arrangement
88 Bearing Support
90 Magnet Spacing Track
100 Stator Module Support Arrangement
102 Rotor Support Arrangement
104 Position Locking Surface Finish
106 Mounting Points
108 Bolts
110 Positioning Jig
120 Stator Module Method
122 Winding Step
124 Annealing Step
126 Binding Step
128 Cutting Step
130 Coil Winding Step
132 Coil Installing Step
134 Core Bracelet Pressing Step
136 Core Bracelet Installing Step
138 Temporary Support
140 Stator Segment Seating Step
142 Stator Segment Orienting Surface
144 Magnets
146 Testing Step
148 Wire Guide Installing Step
150 Wire Guide
152 PCB Installing Step
154 PCB
156 Mold Placing Step
158 Gasket
160 Potting Step
162 Potting Material
164 Jig Removing Step
166 Inspecting and Testing Step
168 Stator Modules
170 PCB
172 Stator Module Controller
174 Input Signal
176 Position Signal
178 Position Detecting Arrangement
180 Center Tap
182 Center Tap
200 Electric Machine

What is claimed is:

1. A rotating electric machine comprising:
a rotor assembly supported for rotation about a rotational axis, the rotor assembly including a plurality of rotor poles, the rotor poles being supported for rotation along a rotor pole circular path about the rotational axis with a desired rotor pole spacing between adjacent rotor poles; and
a stator assembly comprising:
a plurality of independently energizable stator segments, each stator segment including a magnetic core that defines a plurality of stator poles for magnetically interacting with the rotor poles, the stator segments being positioned adjacent to the rotor pole circular path such that the stator poles face the rotor pole circular path with a desired stator pole spacing between adjacent stator poles, the stator segments also being positioned adjacent to only a portion of the rotor pole circular path such that there is at least one stator pole gap between at least two stator poles that is greater than the desired stator pole spacing; and
a stator pole face enlarging piece, the stator pole face enlarging piece being attached to the stator pole portions of the tape wound magnetic core piece to enlarge the surface area of the stator pole face and allow at least portions of the ends of at least some of the multiple layers of thin film soft magnetic tape material to form portions of the stator pole face,
wherein the stator pole face enlarging piece fully surrounds the stator pole portions of the tape wound magnetic core piece and is made from a pressed powder magnetic material with a uniform thickness perpendicular to the stator pole face, with at least one non-energizable termination magnetic core positioned within the stator pole gap and adjacent to one of the stator segments such that the termination core provides an additional magnetic flux return path for magnetic flux associated with the energizing of the adjacent stator segment, said termination core not including coils and not being an active electromagnetic assembly being shorter than an adjacent stator segment.

2. The electric machine of claim 1 wherein the termination magnetic cores are U-shaped magnetic tape wound cores formed from multiple layers of thin film soft magnetic tape material having a desired tape width and tape thickness.

3. The electric machine of claim 1 wherein the stator assembly includes a plurality of independent stator modules with each stator module including a plurality of the stator segments, at least one of the independent stator modules including at least one termination magnetic core.

4. The electric machine of claim 2 wherein there is a stator pole gap between each stator module and wherein each stator module includes at least one termination core.

5. The electric machine of claim 1 wherein the magnetic cores of the stator segments are U-shaped magnetic tape wound cores having two legs and formed from multiple layers of thin film soft magnetic tape material having a desired tape width and tape thickness, the two legs of each U-shaped magnetic tape wound core defining two stator poles of the associated stator segment.

6. The electric machine of claim 5 wherein:
the rotating electric machine is a radial gap electric machine;
each stator segment is positioned such that the two stator poles of each stator segment are located adjacent to one another and in line with one another along a line that is parallel with the rotational axis of the electric machine; and
the rotor poles are pairs of rotor poles formed from adjacent pairs of permanent magnet segments configured to form rotor poles of opposite magnetic polarity, each pair of permanent magnet segments being positioned such that the two permanent magnet segments are located adjacent to one another and in line with one another along a line that is parallel with the rotational axis of the electric machine such that the two permanent magnet segments define two adjacent circular paths around the rotational axis of the electric machine when the rotor is rotated about the rotational axis of the electric machine, each of the two adjacent circular paths facing an associated one of the stator poles of each independently energizable stator segment.

7. A magnetic core for use in a stator assembly of an electric machine having a rotor with a plurality of rotor poles, the magnetic core comprising:
a tape wound magnetic core piece formed from multiple layers of thin film soft magnetic tape material of a desired tape width and tape thickness, the tape wound magnetic core piece defining at least portions of a plurality of stator poles adapted to magnetically interacting with the rotor poles of the electric machine, each stator pole having a pole face adapted to face the rotor of the electric machine, each stator pole face including at least portions of the ends of at least some of the multiple layers of thin film soft magnetic tape material; and
a stator pole face enlarging piece, the stator pole face enlarging piece being attached to the stator pole portions of the tape wound magnetic core piece to enlarge the surface area of the stator pole face and allow at least portions of the ends of at least some of the multiple layers of thin film soft magnetic tape material to form portions of the stator pole face,
wherein the stator pole face enlarging piece fully surrounds the stator pole portions of the tape wound magnetic core piece and is made from a pressed powder magnetic material with a uniform thickness perpendicular to the stator pole face, with
at least one non-energizable termination magnetic core positioned within the stator assembly and adjacent to a stator segment such that the termination core provides an additional magnetic flux return path for magnetic flux associated with the energizing of the adjacent stator segment, said termination core not including coils and not being an active electromagnetic assembly.

8. The magnetic core of claim 7 wherein the tape wound magnetic core piece is a U-shaped magnetic core piece formed by winding multiple layers of the thin film soft magnetic tape material into an oval shape and cutting the winding to form two U-shaped magnetic core pieces, each U-shaped magnetic core piece defining at least portions of two stator poles.

9. The magnetic core of claim 8 wherein the stator pole face includes the cut ends of each layer of the thin film soft magnetic tape material.

* * * * *